United States Patent
Picard et al.

(10) Patent No.: US 12,095,032 B2
(45) Date of Patent: Sep. 17, 2024

(54) SOLID POLYMER ELECTROLYTE INCLUDING COMB POLYMER CONTAINING POLYPENTAFLUOROSTYRENE GRAFTED WITH SOLVATING POLYMERIC SIDE CHAIN

(71) Applicants: COMMISSARIAT A L'ENERGIE ATOMIQUE ET AUX ENERGIES ALTERNATIVES, Paris (FR); UNIVERSITE GRENOBLE ALPES, Saint-Martin D'Heres (FR); CENTRE NATIONAL DE LA RECHERCHE SCIENTIFIQUE, Paris (FR)

(72) Inventors: Lionel Picard, Grenoble (FR); Thomas Clement, Grenoble (FR); Patrice Rannou, Grenoble (FR)

(73) Assignees: COMMISSARIAT A L'ENERGIE ATOMIQUE ET AUX ENERGIES ALTERNATIVES, Paris (FR); UNIVERSITE GRENOBLE ALPES, Saint-Martin d'Heres (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 17/175,124

(22) Filed: Feb. 12, 2021

(65) Prior Publication Data
US 2021/0296699 A1      Sep. 23, 2021

(30) Foreign Application Priority Data
Feb. 14, 2020 (FR) .................................. 20 01488

(51) Int. Cl.
H01M 10/0565 (2010.01)
C08G 81/02 (2006.01)
H01M 10/0525 (2010.01)

(52) U.S. Cl.
CPC ...... *H01M 10/0565* (2013.01); *C08G 81/025* (2013.01); *C08G 81/027* (2013.01); *H01M 10/0525* (2013.01); *H01M 2300/0082* (2013.01)

(58) Field of Classification Search
CPC ............. H01M 10/0565; C01G 81/025; C01G 81/027
(Continued)

(56) References Cited

U.S. PATENT DOCUMENTS

| | | | | |
|---|---|---|---|---|
| 5,240,791 A | * | 8/1993 | Izuti ................... | H01M 10/052 429/317 |
| 5,576,120 A | * | 11/1996 | Saidi ...................... | H01M 4/13 423/641 |

(Continued)

FOREIGN PATENT DOCUMENTS

| | | |
|---|---|---|
| CN | 103872377 A | 6/2014 |
| FR | 3 062 122 A1 | 7/2018 |

(Continued)

OTHER PUBLICATIONS

Ott et al., Post-modification of poly(pentafluorostyrene): a versatile "click" method to create well-defined multifunctional graft copolymers, 2008, Chemical Communications, 3516-3518 (Year: 2008).*

(Continued)

*Primary Examiner* — Sean P Cullen
(74) *Attorney, Agent, or Firm* — Oblon, McClelland, Maier & Neustadt, L.L.P.

(57) ABSTRACT

A solid polymer electrolyte may include: (a) at least one comb polymer including a main chain formed from 1-ethenyl- and/or 1-allyl-2,3,4,5,6-pentafluorobenzene monomers,
(Continued)

some of the monomer units of the main chain bearing polymeric side chains based on polymers that are solvents for alkali metal or alkaline-earth metal salts; the chains being grafted in the para position of the pentafluorophenyl groups; and (b) at least one alkali metal or alkaline-earth metal salt, in particular a lithium salt. A process may prepare such a solid polymer electrolyte film it may be used in an electrochemical system, in particular a lithium battery.

20 Claims, 20 Drawing Sheets

(58) Field of Classification Search
USPC .......................................... 429/304, 307, 303
See application file for complete search history.

(56) References Cited

U.S. PATENT DOCUMENTS

| | | | | |
|---|---|---|---|---|
| 5,698,338 | A * | 12/1997 | Barker | H01M 4/525 |
| | | | | 429/223 |
| 6,103,419 | A * | 8/2000 | Saidi | H01M 10/0525 |
| | | | | 429/223 |
| 6,159,638 | A * | 12/2000 | Takatera | H01M 10/0565 |
| | | | | 429/316 |
| 6,562,513 | B1 * | 5/2003 | Takeuchi | H01M 10/052 |
| | | | | 429/189 |
| 2015/0307720 | A1 | 10/2015 | Wooley et al. | |
| 2020/0071445 | A1 | 3/2020 | Buvat et al. | |
| 2022/0311051 | A1 * | 9/2022 | Saito | H01M 10/0565 |

FOREIGN PATENT DOCUMENTS

| | | | | |
|---|---|---|---|---|
| KR | 10-2018-0124546 | A | 11/2018 | |
| KR | 2018124540 | A * | 11/2018 | ............ C08J 5/2206 |
| WO | WO 2018/213627 | A1 | 11/2018 | |

OTHER PUBLICATIONS

Noy et al., Para-Fluoro Postpolymerization Chemistry of Poly(pentafluorobenzyl methacrylate): Modification with Amines, Thiols, and Carbonylthiolates, Sep. 2017, Macromolecules, 50, 7028-7040 (Year: 2017).*

Cai et al., Preparation of jellyfish-shaped amphiphilic block-graft copolymers consisting of a poly(ε-caprolactone)-block-poly(pentafluorostyrene) ring and poly(ethylene glycol) lateral brushes, Feb. 2012, Polymer Chemistry, 3, 1061-1068 (Year: 2012).*

Ma et al., Well-Defined Multifunctional Fluorocopolymers: Having Both Amphiphilic Structure and Reactive Sites, 2009, Polymer Preprints, 50, 229 (Year: 2009).*

French Preliminary Search Report issued Oct. 14, 2020 in French Application 20 01488 filed Feb. 14, 2020 (with English Translation of Categories of Cited Documents), 4 pages Cho, H. et al., "Novel Anion Exchange Membrane Based on Poly(Pentafluorostyrene) Substituted with Mercaptotetrazole Pendant Groups and Its Blend with Polybenzimidazole for Vanadium Redox Flow Battery Applications," Polymers, vol. 12, No. 4, Jan. 1, 2020, XP55739536, 14 pages.

Cai, T. et al., "Preparation of jellyfish-shaped amphiphilic block-graft copolymers consisting of a poly (ε-caprolactone)-block-poly(pentafluorostyrene) ring and poly(ethylene glycol) lateral brushes," Polymer Chemistry, vol. 3, No. 4, Jan. 1, 2012, XP55739554, 8 pages.

Delaittre, G. et al., "The para-fluoro-thiol reaction as an efficient tool in polymer chemistry," Polymer Chemistry, vol. 9, 2018, 7 pages.

Bates, C. M. et al., "ABA Triblock Brush Polymers: Synthesis, Self-Assembly, Conductivity, and Rheological Properties," Macromolecules, vol. 48, 2015, 7 pages.

Li, S. et al., "Molecular Brush with Dense PEG Side Chains: Design of a Well-Defined Polymer Electrolyte for Lithium-Ion Batteries," Macromolecules, vol. 52, 2019, 10 pages.

Makiguchi, K. et al., "Diphenyl Phosphate as an Efficient Cationic Organocatalyst for Controlled/Living Ring-Opening Polymerization of d-Valerolactone and ε-Caprolactone," Macromolecules, vol. 44, 2011, 7 pages.

Ott, C. et al., "Post-modification of poly(pentafluorostyrene): a versatile "click" method to create well-defined multifunctional graft copolymers," Chem. Comm., 2008, 3 pages.

Powell, K. T. et al. "Complex Amphiphilic Hyperbranched Fluoropolymers by Atom Transfer Radical self-Condensing Vinyl (Co)polymerization," Macromolecules, vol. 40, 2007, 7 pages.

Pollack, K. A. et al., Hyperbranched Fluoropolymer-Polydimethylsiloxance-Poly(ethylene glycol) Cross-Liked Terpolymer Networks Designed for Marine and Biomedical Applications: Heterogeneous Nontoxic Antibiofouling Surfaces, Applied Materials & Interfaces, vol. 6, 2014, 10 pages.

* cited by examiner

SOLID POLYMER ELECTROLYTE INCLUDING COMB POLYMER CONTAINING POLYPENTAFLUOROSTYRENE GRAFTED WITH SOLVATING POLYMERIC SIDE CHAIN

CROSS-REFERENCE TO RELATED APPLICATIONS

The present application claims the benefit of the filing date of French Appl. No. 2001488, filed on Feb. 14, 2020.

TECHNICAL FIELD

The present invention relates to a novel solid polymer electrolyte based on a comb polymer, and also to a method for preparing same.

Such electrolytes may be used in various electrochemical systems or devices, notably in lithium batteries.

PRIOR ART

Conventionally, the operating principle of an electrochemical generator is based on the insertion and the removal, also known as the deinsertion, of an alkali metal ion or of a proton, into and from the positive electrode, and the deposition or extraction of this ion, onto and from the negative electrode.

The main systems use the lithium cation as ion transference species. In the case of a lithium accumulator, for example, the lithium cation extracted from the positive electrode during the charging of the battery becomes deposited on the negative electrode, and conversely, it is extracted from the negative electrode to become inserted in the positive electrode during discharging.

Transference of the proton or of the alkali metal or alkaline-earth metal cation, in particular of the lithium cation, between the positive electrode and the negative electrode, is ensured by an ion-conducting electrolyte.

The formulation of the electrolyte used is of fundamental importance as regards the performance of the electrochemical system, in particular when it is used at very low or very high temperatures. The ion conductivity of the electrolyte notably conditions the efficiency of the electrochemical system, given that it has an impact on the mobility of the ions between the positive and negative electrodes.

Other parameters also play a part in the choice of the electrolyte used. These are notably its thermal, chemical or electrochemical stability in the electrochemical system, and also economic, safety and environmental criteria, notably including the toxicity of the electrolyte.

In general, the electrolytes of electrochemical systems are in liquid, gelled or solid form.

As regards electrolytes in liquid form, the conventional electrolytes of electrochemical generators with a metal cation from one of the first two columns of the Periodic Table of the Elements, for example lithium, are composed of a salt of this cation dissolved in an organic or aqueous medium (conventionally in carbonate solvents or acetonitrile for lithium batteries), in the presence or absence of additives.

For example, conventional supercapacitor electrolytes are composed of an organic salt (conventionally a salt of tetraethylammonium tetrafluoroborate $Et_4N\text{-}BF_4$) dissolved in acetonitrile.

Their use in a whole electrochemical storage system, for example in an Li-ion battery, nevertheless requires the addition of a separator to ensure electrical insulation between the positive and negative electrodes. Also, even though these electrolytes have good ion conductivities, they nevertheless pose safety and cost problems in the context of using organic solvents (low thermal stability) and electrochemical stability problems in the context of using an aqueous medium.

As regards gelled electrolytes, these are liquid electrolytes, for example as described previously, trapped in a "host" polymer. The solvent(s) for the liquid electrolyte must have affinity for the host polymer that is neither too strong (dissolution of the polymer) nor too weak (exudation). The host polymer must enable maximum incorporation of liquid while at the same time conserving mechanical properties to ensure the physical separation between the two electrodes.

Finally, to address the safety problems associated with the presence of the solvent, it was proposed to use solid polymer electrolytes, free of solvent. These polymers included in the composition of the electrolyte must have good ion-conducting properties in order to be able to be used satisfactorily in electrochemical generator and storage systems.

The most common polymer electrolytes for lithium electrochemical devices are based on polyether, and more particularly poly(oxyethylene) (POE), in which an alkali metal or alkaline-earth metal salt (depending on the chemistry of the electrodes) is dissolved. However, these electrolytes have limited performance in terms of ion conductivity (<0.1 $mS \cdot cm^{-1}$) and electrochemical stability (about 4V vs $Li/Li^+$) at temperatures below 60° C. on account of the crystallization of the polymer. They therefore require a high working temperature (60° C. to 80° C.) and are thus conductive in a molten physical state. Various studies have been performed for the purpose of improving the ion-conducting performance of polymer electrolytes. Thus, polymer electrolytes based on poly(trimethylene carbonate) (PTMC) were proposed. PTMC has better conductivity and good electrochemical stability (up to 5V vs $Li/Li^+$), without any loss in performance due to crystallization at the working temperatures. However, these polymers have limited mechanical performance.

In order to overcome these limitations, it was proposed to synthesize copolymers including a rigid block, which provides mechanical properties suited to their use as electrolyte, and an ion-conducting block.

For example, Bates et al. [2] describe an electrolyte formed from a comb polymer of A-B-A triblock type, the main chain of which is a polynorbornene, the blocks A and B being respectively formed from norbornene units grafted with polystyrene and POE. These polymers make it possible to achieve ion conductivity of the order of 103 S/cm at 105° C. However, the triazacyclopentene function connecting the polystyrene to the norbornene intrinsically limits the electrochemical stability of the electrolyte for high potential differences.

Mention may also be made of the publication by Li et al. [3] which proposes an architecture having a poly(tert-butyl 2-((2-bromopropionyloxy)methyl)acrylate) (PtBBMA) backbone and a poly(ethylene glycol)methyl ether methacrylate (PEGMA) side chain. However, the acrylate chains are liable to pose a problem of electrochemical stability.

Thus, improving the performance of electrolytes is an ongoing objective.

SUMMARY OF THE INVENTION

The present invention is precisely directed toward affording access to novel solid polymer electrolytes, combining excellent performance in terms of ion conductivity and mechanical stability.

More particularly, according to a first of its aspects, the invention relates to a solid polymer electrolyte comprising, or even being formed from:
- at least one comb polymer comprising a main chain formed from 1-ethenyl- and/or 1-allyl-2,3,4,5,6-pentafluorobenzene monomers, some of the monomer units of the main chain bearing polymeric side chains based on polymers that are solvents for alkali metal or alkaline-earth metal salts; said chains being grafted in the para position of the pentafluorophenyl groups; and
- at least one alkali metal or alkaline-earth metal salt, in particular a lithium salt.

For the purposes of the invention, the term "solid electrolyte" means an electrolyte excluding the presence of a component in liquid form, and acting both as a separator and as an ion conductor in an electrochemical system.

In the continuation of the text, a polymer chain (or polymer) formed from 1-ethenyl- and/or 1-allyl-2,3,4,5,6-pentafluorobenzene monomers is more simply denoted as a main chain (or polymer) "of PPFS" type.

Preferably, the comb polymer used according to the invention has a degree of molar grafting with polymeric side chains of less than or equal to 99%, preferably between 25% and 95% and notably between 50% and 95%.

Preferably, the polymeric side chains of a comb polymer according to the invention are connected in the para position of the pentafluorophenyl groups of the main chain of PPFS type via an oxygen atom.

As detailed more particularly in the rest of the text, the polymeric side chains may more particularly be chains of polyalkylene glycol type, in particular of poly(ethylene oxide) (written POE or PEO) type.

It may also be a comb polymer bearing polymeric side chains formed from at least one cyclic monomer chosen from 5- to 8-membered lactones and cyclic carbonates, in particular side chains of poly(trimethylene carbonate) (PTMC) or poly(ε-caprolactone) (PCL) type.

A solid polymer electrolyte film may be prepared from the mixture of a comb polymer according to the invention and of an alkali metal or alkaline-earth metal salt, either via the approach using a solvent medium (referred to hereinbelow as the "solvent route"), or via the approach using the molten polymer, in the absence of solvent (referred to hereinbelow as the "melt route").

Thus, the invention also relates to a process for preparing a solid polymer electrolyte film according to the invention, comprising at least the following steps:
(i) mixing at least one comb polymer according to the invention and at least one alkali metal or alkaline-earth metal salt, in particular a lithium salt, in the presence or absence of a solvent medium; and
(ii) forming, in particular on the surface of a substrate, a film from said mixture.

Comb polymers whose architecture presents a chain of PPFS type bearing side chains have already been synthesized. For example, Ott et al. [5] describe the modification of a poly(2,3,4,5,6-pentafluorostyrene) polymer with a low weight-average molecular mass with polyethylene glycol chains bearing a chain-end amine function. Also, Cai et al. [6] describe the synthesis of a grafted PCL-b-(PPFS-g-PEO) block copolymer in which the PEO grafts are obtained by grafting polyethylene glycols polymers bearing an end group of thiol type.

Mention may also be made of the publications by Powell et al. [7] and Pollack et al. [8] which describe "hyperbranched" polymeric structures, different from a comb structure. The comb polymers and hyperbranched polymeric structures described in these documents are, however, not in any way envisaged for use for forming a solid polymer electrolyte.

The solid polymer electrolyte obtained according to the invention proves to be advantageous in several respects.

As illustrated in the examples that follow, the solid polymer electrolyte according to the invention thus has excellent performance in terms of ion conductivity, even in the absence of additives. In particular, it has an $Li^+$ ion conductivity, measured at 60° C., of greater than or equal to 106 $S \cdot cm^{-1}$, in particular greater than or equal to 105 $S \cdot cm^{-1}$, advantageously greater than or equal to $5 \times 10^{-5}$ $S \cdot cm^{-1}$.

Moreover, the solid polymer electrolyte according to the invention shows good electrochemical stability on cycling.

A solid polymer electrolyte according to the invention thus affords access to high ion-conducting performance, without this being at the expense of the mechanical integrity of the electrolyte.

The solid polymer electrolyte according to the invention may be used in many electrochemical systems, such as generators, in particular lithium batteries.

According to another of its aspects, the invention also relates to the use of a solid polymer electrolyte film according to the invention in an electrochemical system, in particular in a lithium battery, notably a lithium-ion or lithium-metal battery.

The invention also relates to an electrochemical system, in particular a lithium battery, comprising a solid polymer electrolyte film according to the invention or as obtained according to the process of the invention.

An electrochemical system, for example a lithium battery, made from a solid electrolyte according to the invention can function over a wide temperature range, preferably between 20° C. and 100° C., more preferentially between 40 and 80° C.

Advantageously, a solid polymer electrolyte based on a comb polymer bearing polymeric side chains formed from cyclic monomers chosen from 5- to 8-membered lactones and cyclic carbonates, in particular side chains of poly(trimethylene carbonate) (PTMC) or poly(ε-caprolactone) (PCL) type, may advantageously be used in high-energy-density batteries, in combination with "high"-potential positive electrodes, i.e. electrodes operating at a potential difference of greater than 4 V versus $Li/Li^+$, in particular greater than or equal to 5V versus $Li/Li^+$, such as $Li^0$ vs $LiNi_{1/3}Mn_{1/3}Co_{1/3}O_2$ batteries, without having an impact on the thermal and electrochemical stability of the electrolyte.

Other features, variants and advantages of the solid polymer electrolyte according to the invention and of its preparation will emerge more clearly on reading the description, the examples and the figures that follow, which are given as nonlimiting illustrations of the invention.

Figure 1:
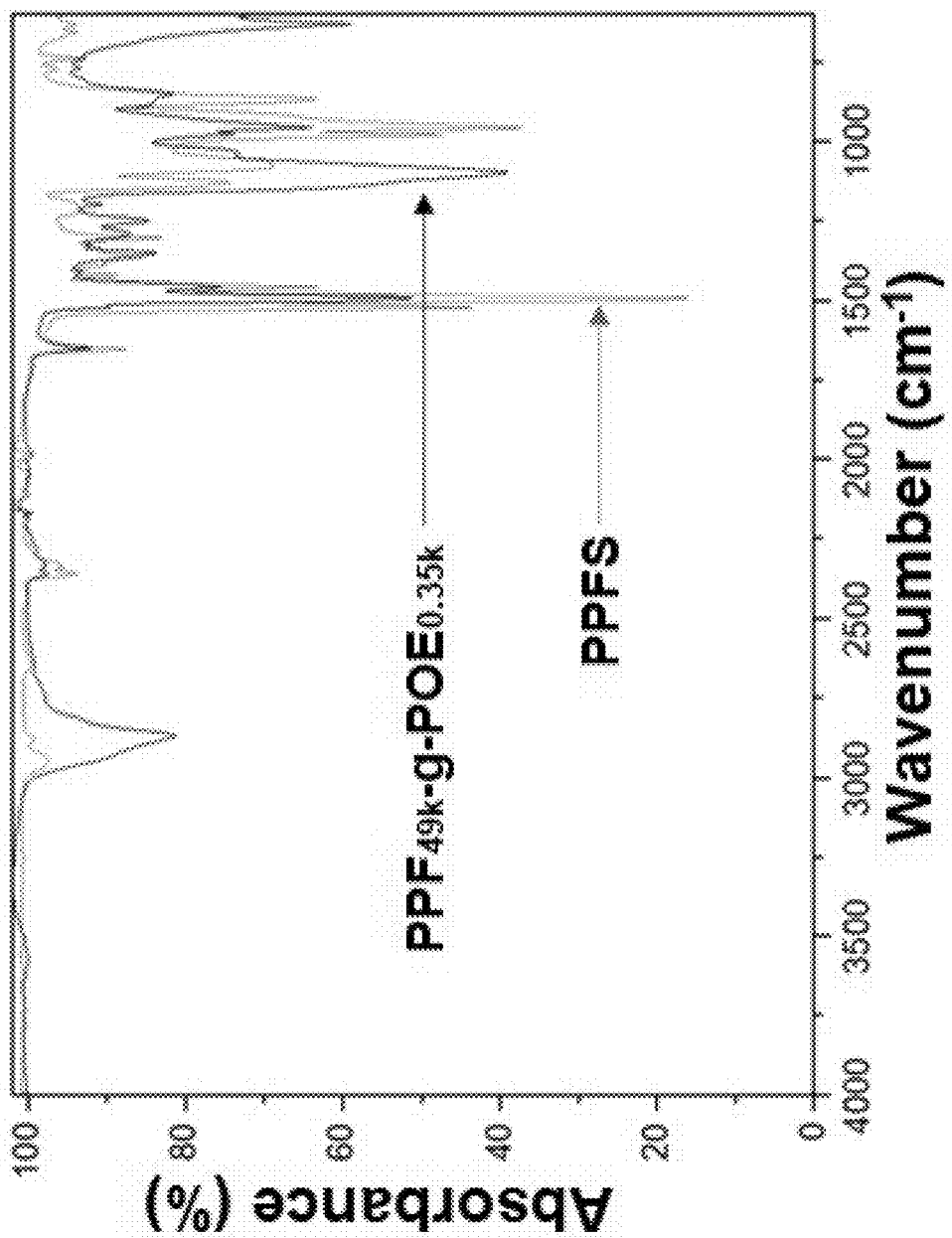
FIG. 1 shows the infrared spectra, respectively, of poly (2,3,4,5,6-pentafluorostyrene) (PPFS) and of poly(2,3,4,5,6-pentafluorostyrene) bearing poly(ethylene oxide) grafts ("$PPFS_{49k}$-g-$PEO_{0.35k}$") prepared according to example 1.

In the continuation of the text, the expressions "between . . . and . . . ", "ranging from . . . to . . . " and "varying from . . . to . . . " are equivalent and are intended to mean that the limits are included, unless otherwise mentioned.

DETAILED DESCRIPTION

Comb Polymer According to the Invention

The invention uses a comb polymer comprising, or even being formed from, a main chain formed from 1-ethenyl- and/or 1-allyl-2,3,4,5,6-pentafluorobenzene monomers, some of the monomer units of the main chain bearing polymeric side chains based on polymers that are solvents for alkali metal or alkaline-earth metal salts, said chains being grafted in the para position of the pentafluorophenyl groups.

The comb polymer used according to the invention will be denoted more simply in the continuation of the text by the term "comb polymer".

The term "comb polymer", also referred to as a branched copolymer, means a polymer which has a linear main polymer chain and at least two side chains or pendent chains attached to the main chain at points located between the two ends of the main chain, known as branching points. In contrast with linear polymers which include non-polymeric side groups or pendent groups, the side chains of the comb polymers are oligomers, polymers or copolymers.

In particular, a copolymer is different from networks of "hyperbranched" polymers. In particular, the polymeric side chains borne by the main chain of the comb polymer according to the invention do not themselves bear polymeric side chains.

In the present description, in the absence of indications to the contrary, the term "polymer" will be used to denote, in the broad sense, both homopolymers and copolymers. The term "copolymer" means a polymer derived from at least two different monomer species.

In the context of the present invention, the term "monomer unit" means the smallest constituent unit whose repetition leads to a polymer chain.

As mentioned previously, the main chain of the comb polymers according to the invention is formed from 1-ethenyl and/or 1-allyl-2,3,4,5,6-pentafluorobenzene monomers. The monomers of the type such as 1-ethenyl-2,3,4,5,6-pentafluorobenzene, also more commonly known as 2,3,4,5,6-pentafluorostyrene (PFS) and 1-allyl-2,3,4,5,6-pentafluorobenzene (IUPAC name 1,2,3,4,5-pentafluoro-6-prop-2-enylbenzene) correspond to formula (M1) below:

[Chem 1]

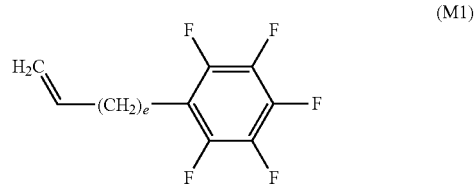

(M1)

in which e is 0 (in the case of pentafluorostyrene) or e is 1 (in the case of 1-allyl-2,3,4,5,6-pentafluorobenzene).

Preferably, the main chain of the comb polymer according to the invention is formed from a homopolymer.

According to a first embodiment, the main chain of the comb polymer according to the invention is formed from a poly(2,3,4,5,6-pentafluorostyrene) (PPFS).

According to another embodiment, the main chain of the comb polymer according to the invention is formed from a poly(1,2,3,4,5-pentafluoro-6-prop-2-enylbenzene).

For the sake of simplicity, in the continuation of the text, the main polymer chain of the comb polymers according to the invention, in particular of the type such as poly(2,3,4,5,6-pentafluorostyrene) or poly(1,2,3,4,5-pentafluoro-6-prop-2-enylbenzene), will be denoted more simply by the name "chain of pentafluorostyrene type" or "chain of PPFS type".

In particular, the main polymer chain of the comb polymers used according to the invention may have a number-average degree of polymerization, corresponding to the number of constituent monomer units of the main polymer chain, of greater than or equal to 50, in particular between 50 and 4200 and more particularly between 50 and 520.

The main polymer chain of the comb polymers used according to the invention may have a number-average molecular mass Mn of between 5000 g·mol$^{-1}$ and 1 000 000 g·mol$^{-1}$, in particular between 10 000 g·mol$^{-1}$ and 200 000 g·mol$^{-1}$, notably between 10 000 g·mol$^{-1}$ and 100 000 g·mol$^{-1}$ and more particularly between 20 000 g·mol$^{-1}$ and 50 000 g·mol$^{-1}$.

In particular, said main chain has a number-average molecular mass Mn of between 9700 g·mol$^{-1}$ and 814 800 g·mol$^{-1}$, in particular between 9700 g·mol$^{-1}$ and 100 880 g·mol$^{-1}$ and more particularly between 12 000 g·mol$^{-1}$ and 50 000 g·mol$^{-1}$.

The number-average molecular mass may be determined by size exclusion chromatography (SEC).

The comb polymer used according to the invention may or may not have main chains of PPFS type of low dispersity.

According to a particular embodiment, the comb polymer according to the invention has a main chain formed from a poly(2,3,4,5,6-pentafluorostyrene), in particular having a number-average molecular mass of between 9700 g·mol$^{-1}$ and 814 800 g·mol$^{-1}$, in particular between 9700 g·mol$^{-1}$ and 200 000 g·mol$^{-1}$, notably between 9700 g·mol$^{-1}$ and 100 880 g·mol$^{-1}$ and more particularly between 12 000 g·mol$^{-1}$ and 50 000 g·mol$^{-1}$. Preferably, as described in the continuation of the text, the length of the main chain of the comb polymer according to the invention, in other words the degree of polymerization of the main chain of the comb polymer according to the invention, is sufficiently high, so that the comb polymer formed according to the invention has a molar mass greater than the "critical molar mass for chain entanglement".

The critical molar mass for chain entanglement, denoted as Mc, for a given polymer, is generally defined as the mass at and above which the dynamics of the polymer are located in a creep regime. This critical molar mass for chain entanglement may be determined empirically via methods known to those skilled in the art.

Controlling the average molecular mass of the comb polymer according to the invention makes it possible to control the mechanical properties of the comb polymer obtained, and in particular its viscoelastic properties.

The comb polymer according to the invention is advantageously capable of forming a three-dimensional network, resulting from the entanglement of the polymer chains, and has a rubbery plateau that can be identified, for example, by means of rheological measurements (for example Young's modulus and shear modulus measured by multi-frequency dynamic mechanical analysis) on the polymer formed.

By way of example, a comb polymer according to the invention formed from a poly(2,3,4,5,6-pentafluorostyrene) main chain, grafted with side chains of poly(ethylene oxide) type has a glass transition temperature, denoted as Tg, of −60° C.; a comb polymer according to the invention formed from a poly(2,3,4,5,6-pentafluorostyrene) main chain, grafted with side chains of poly(trimethylene carbonate) type has a Tg of −40° C.

Preferably, the comb polymer according to the invention has a degree of molar grafting with polymeric side chains of less than or equal to 99%, preferably between 25% and 95% and notably between 50% and 95%.

The term "polymeric side chain" (or "side chain based on a polymer" means that at least a part of the side or pendent chain, attached to the main chain, is formed from a polymer (or from said polymer). It is not at all excluded for this side chain to comprise other functionalities, for instance a function or a sequence of functions connecting the side chain to the main chain, or alternatively a function at the free end of the side chain, for example a function derived from the initiator which served for the synthesis of the polymer of said side chain.

As mentioned previously, the comb polymer according to the invention comprises polymeric side chains at least partly formed from polymers that are solvents for alkali metal or alkaline-earth metal salts, also known as solvating polymers.

For the purposes of the invention, a "solvating" polymer is a polymer that is capable of dissolving one or more alkali metal or alkaline-earth metal salts, for example lithium, sodium, magnesium or calcium salts, in particular lithium salts. More particularly, a solvating polymer comprises heteroatoms, preferably oxygen atoms.

A solvating polymer is a polymer which includes solvating units that are capable of ionically dissociating a metal salt (or of solvating the cations of the alkali metal or alkaline-earth metal salt), in particular units containing at least one heteroatom, notably chosen from sulfur, oxygen and nitrogen, preferably oxygen.

The solvating polymers forming said side chains of the comb polymer according to the invention are thus, in combination with an alkali metal or alkaline-earth metal salt, ion conductors.

The term "ion-conducting" polymer is intended to denote a polymer that is capable of conducting ions, and more particularly cations, in particular the proton H+ and alkali metal or alkaline-earth metal cations, and more particularly capable of conducting lithium cations. The ion conduction mechanism of said polymer chains used according to the invention may be of different nature.

Preferably, the polymeric side chains are formed from homopolymers.

The polymeric side chains of a comb polymer according to the invention more particularly comprise oxygen atoms, in particular ether, ester or carbonate ester functions.

Preferably, the polymeric side chains are connected in the para position of the pentafluorophenyl groups of the main chain of PPFS type via an oxygen atom, more particularly via an ether function. In other words, the carbon atom in the para position of the pentafluorostyrene group in a grafted monomer unit of a comb polymer according to the invention bears an oxygen atom.

The invention thus relates, according to another of its aspects, to a comb polymer comprising a main chain formed from 1-ethenyl and/or 1-allyl-2,3,4,5,6-pentafluorobenzene monomers and polymeric side chains grafted in the para position of the pentafluorophenyl groups; in which said polymeric side chains are connected to said main chain via an oxygen atom; the degree of molar grafting with polymeric side chains being greater than or equal to 50%.

In particular, the comb polymer according to the invention may comprise grafted monomer units of formula (I) the polymeric side chain of the comb polymer, as seen below, being grafted in a para-position of a tetrafluorophenyl group—below:

[Chem 2]

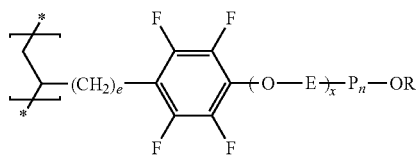

(I)

in which:
e is 0 or 1;
x is 0 or 1;
E represents a $C_1$ to $C_6$, in particular a $C_1$ to $C_3$ and notably $C_1$ or $C_2$ alkylene group;
$P_n$ represents a polymer chain at least partly formed from a polymer that is a solvent for alkali metal or alkaline-earth metal salts, in particular lithium salts, more particularly comprising oxygen atoms, in particular ether, ester or carbonate ester functions; preferably, $P_n$ is of formula (C) below:

[Chem 3]

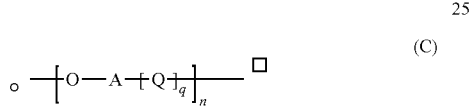

(C)

with A representing a linear or branched $C_2$ to $C_{11}$ alkylene group, in particular a linear $C_2$ to $C_{11}$ and in particular $C_2$ to $C_5$ alkylene group (in other words a group —$(CH_2)_p$— with p being an integer between 2 and 11, in particular between 2 and 5);
q is 0 or 1;
Q represents an oxycarbonyl —OC(O)— or carbonyl —C(O)— group;
n is a positive integer, corresponding to the degree of polymerization of the polymer chain $P_n$;
in particular, n is greater than or equal to 4, in particular between 5 and 1000, notably between 5 and 500 and more particularly between 5 and 100;
o representing the connection of the polymeric side chain to the monomer unit of the main chain, where appropriate via the group —O-E- and □ representing the connection with the group OR;
R represents a "non-reactive" group (or chain end).
The term "non-reactive" group is intended to denote a group that is not reactive under the conditions of preparation and use of the comb polymer. More particularly, the group R does not bear a function that is reactive toward the constituent monomer units of the main chain of PPFS type and the polymer chains constituting the side chains in the comb polymer formed, nor a function that is reactive toward alkali metals or alkaline-earth metals, notably toward lithium metal, alkali metal or alkaline-earth metal salts, notably toward lithium salts, and the various active materials according to the invention. Thus, the group R must notably not include any hydroxyl functions, amine functions, thiol functions or halogen atoms other than fluorine atoms.
The group R may more particularly be:
a linear or branched alkyl group, which may be substituted with fused or nonfused, saturated or unsaturated, aromatic or nonaromatic monocyclic or polycyclic or monoheterocyclic or polyheterocyclic groups; or
a fused or nonfused, saturated or unsaturated, aromatic or nonaromatic monocyclic or polycyclic or monoheterocyclic or polyheterocyclic group;
the alkyl group and/or said mono- or poly(hetero)cyclic group(s) possibly being optionally substituted with one or more fluorine atoms.

In the context of the invention, the following definitions apply:
"$C_{t-z}$" in which t and z are integers, a carbon-based chain possibly containing from t to z carbon atoms; for example $C_{1-4}$ is a carbon-based chain which may contain from 1 to 4 carbon atoms;
"alkyl": a linear or branched, saturated aliphatic group; for example, a $C_{1-4}$ alkyl group represents a linear or branched carbon-based chain of 1 to 4 carbon atoms, more particularly a methyl, ethyl, propyl, isopropyl, butyl, isobutyl or tert-butyl;
"polycyclic group": a group containing two or more nuclei (rings), which are fused (ortho-fused or ortho- and peri-fused) together, i.e. having, in pairs, at least two carbons in common;
"heterocycle": a cyclic group, which is preferably 4-, 5- or 6-membered, comprising one or more heteroatoms, in particular chosen from oxygen, sulfur and nitrogen. The mono- or poly(hetero)cyclic groups according to the invention may be unsaturated, partially saturated or saturated. An aromatic ring may notably be benzene.

In particular, a polycyclic group according to the invention is formed from 2 to 6 rings, the rings comprising, independently of each other, from 4 to 6 ring members. The polycyclic group may include one or more heteroatoms. It is then referred to as a "polyheterocyclic group".

According to a particular embodiment, the comb polymer according to the invention thus comprises grafted monomer units of formula (I') below:

[Chem 4]

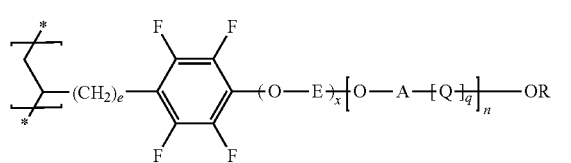

(I')

in which e, E, x, A, Q, q, n and R are as defined previously.
More particularly, the comb polymer according to the invention may comprise grafted monomer units of formula (I"):

[Chem 5]

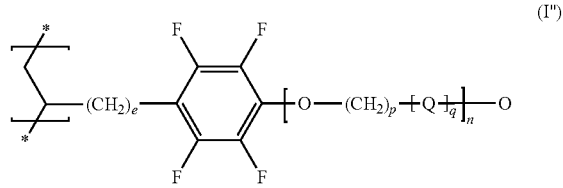

(I")

in which e, p, Q, q, n and R are as defined previously.
The groups R at the free end of the side chains may be more particularly derived from the initiator ROH used for the synthesis of said grafted polymeric chain, in particular for the ring-opening synthesis (also known as "ring-opening polymerization" (ROP)) of cyclic monomers of lactone or cyclic carbonate type, as described more specifically in the continuation of the text. Examples of initiators ROH are more particularly given in the continuation of the text.

Preferably, the group R has a molar mass of less than or equal to 500 g·mol"1, in particular between 30 and 300 g·mol"1, preferably less than or equal to 260 g·mol$^{-1}$, notably less than or equal to 250 g·mol$^{-1}$.

Preferably, the group R represents:
a $C_1$ to $C_{20}$ alkyl group optionally substituted with a phenyl group; or
a phenyl group;
said alkyl and phenyl group(s) being optionally substituted with one or more fluorine atoms.

By way of example, R may be a methyl group or a 3-phenylpropyl group.

Preferably, the polymeric side chains of the comb polymer according to the invention have a number-average degree of polymerization, corresponding to the number of constituent monomer units of the polymeric side chain, of greater than or equal to 4, in particular between 5 and 1000, more particularly between 5 and 500 and more particularly between 5 and 100.

In particular, the comb polymer according to the invention may comprise grafted monomer units of the abovementioned formula (I'), in which n is greater than or equal to 4, in particular between 5 and 1000, more particularly between 5 and 500 and more particularly between 5 and 100.

The polymeric side chains of the comb polymer according to the invention preferably have a number-average molecular mass Mn of between 200 and 120 000 g·mol$^{-1}$, in particular between 200 and 60 000 g·mol$^{-1}$ and more particularly between 200 and 12 000 g·mol$^{-1}$.

The number-average molecular mass may notably be controlled during the synthesis of the constituent polymer of the side chains by means of the mole ratio of said monomer(s) to the initiator.

Preferably, the polymeric side chains of the comb polymer according to the invention have a low dispersity, reflecting approximately identical side chain lengths. In particular, the mass dispersity, denoted as $D_w$, is preferably between 1 and 2.5, in particular between 1.01 and 1.5. A low dispersity of the side chains of the comb polymer according to the invention advantageously makes it possible to achieve, during its use for forming a solid polymer electrolyte according to the invention, better nanosegregation of the phases between the main chains comprising the fluorinated aromatic rings and the side chains based on solvating polymers; and thus to improve the mechanical and ion conductivity properties.

The mass dispersity $D_w$ may be calculated from the equation $D_w=M_w/M_n$ with $M_w$ representing the weight-average molecular mass, and $M_n$ representing the number-average molecular mass.

Preferably, the comb polymer used according to the invention is of formula (II):

[Chem 6]

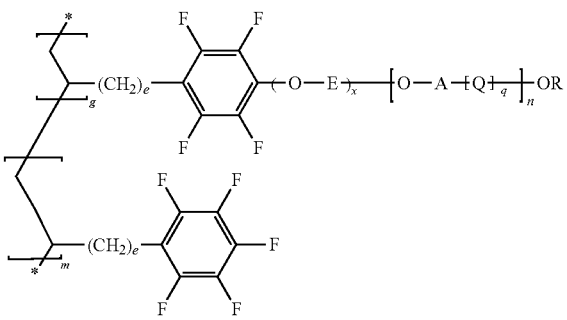

(II)

in which e, E, x, A, q, Q, n and R are as defined previously;
g corresponds to the average number of monomer units bearing polymeric side chains according to the invention; and
m corresponds to the average number of non-grafted monomer units;
with g/(g+m), representing the molar degree of grafting with polymeric side chains, being less than or equal to 0.99, in particular being between 0.25 and 0.95, in particular between 0.5 and 0.95;
the order of succession of the two types of monomer units forming the polymer of formula (II) being totally random.

In particular, the comb polymer used according to the invention may be of formula (II'):

[Chem 7]

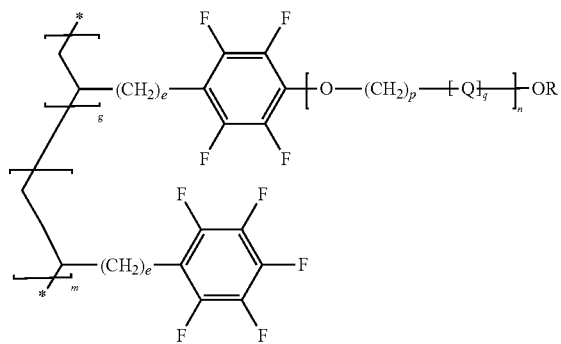

(II')

in which e, p, q, Q, n, R, g and m are as defined previously, the order of succession of the two types of monomer units forming the polymer of formula (II') being totally random.

The chain ends of the main polymer chain of PPFS type, not represented in the abovementioned formulae (II) and (II'), may be, for example, methyl, ethyl, butyl or alkenyl groups. The nature of these end groups notably depends on the nature of the Ziegler-Natta catalyst used for the synthesis of the main chain of PPFS type, as detailed in the continuation of the text.

According to a first embodiment variant, the comb polymer according to the invention has side chains of polyalkylene glycol type, for example of polyethylene glycol and/or polypropylene glycol type, or copolymers thereof. Preferably, the comb polymer according to the invention may contain side chains of polyethylene glycol type (also known as poly(ethylene oxide) or PEO).

In other words, the comb polymer according to the invention may more particularly comprise monomer units of the abovementioned formula (I'), in which x is 0 or 1, in particular x is 0; q=0, A represents —$(CH_2)_p$— with p between 2 and 5, in particular p is 2; and R represents $CH_3$.

The monomer units of the main chain of PPFS type of the comb polymer according to the invention may thus be of formula (I'-a) below:

[Chem 8]

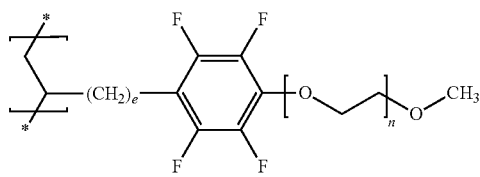

(I'-a)

in which e and n are as defined previously, in particular e is 0.

In particular, the comb polymer may be of the abovementioned formula (II'), in which q=0, p=2 and R represents $CH_3$.

Preferably, the side chains of poly(alkylene glycol) type, in particular of poly(ethylene oxide) type, of the comb polymer according to the invention have a degree of polymerization of between 4 and 1000, in particular greater than or equal to 5, preferably greater than or equal to 6, in particular between 8 and 100.

In particular, the grafted chains of poly(ethylene oxide) type may have a weight-average molar mass of between 200 and 50 000 g·mol$^{-1}$, preferably between 350 and 5000 g·mol$^{-1}$.

According to a particular embodiment, the comb polymer according to the invention is formed from a poly(2,3,4,5,6-pentafluorostyrene) main chain, bearing side chains of poly(ethylene oxide) type.

According to another embodiment variant, the comb polymer according to the invention contains polymeric side chains formed from at least one cyclic monomer chosen from 5- to 8-membered lactones and cyclic carbonates, and in particular side chains of poly(trimethylene carbonate) (denoted as PTMC) or poly(s-caprolactone) (denoted as PCL) type.

As described more precisely in the continuation of the text, the polymer chains used as side chains of a comb polymer according to the invention may be obtained by ring-opening polymerization of one or more cyclic monomers chosen from 5- to 8-membered lactones and cyclic carbonates, in the presence of at least one organic molecule, known as an "initiator", bearing a hydroxyl function, denoted as ROH.

The cyclic monomers correspond more particularly to the following formula:

[Chem 9]

(M2)

in which:
X represents a carbon atom or an oxygen atom;
$n_1$ is 0 or is an integer between 1 and 9, in particular between 1 and 3;
said monomers being optionally substituted, on one or more of the carbon atoms of the ring, with one or more substituents $R_1$.

The substituents of the cyclic monomer, $R_1$, may be chosen more particularly from linear or branched alkyl groups, in particular $C_1$ to $C_5$ alkyl groups.

According to a particular embodiment, the comb polymer according to the invention contains polymeric side chains formed from monomers of 5- to 8-membered cyclic carbonate type.

The cyclic carbonates may more particularly be of formula (M3) below:

[Chem 10]

(M3)

$m_1$ being an integer between 1 and 3 and preferably $m_1$ being 1 or 2;
said monomers being optionally substituted, on one or more of the carbon atoms of the ring, with one or more substituents $R_1$ as defined previously.

As examples of cyclic carbonate monomers, mention may be made of trimethylene carbonate and derivatives thereof, in particular trimethylene carbonate.

A comb polymer according to the invention may more particularly comprise monomer units of the abovementioned formula (I'), in which x is 0 or 1, preferably x=0; q=1; A represents —$(CH_2)_p$— with p between 2 and 4, in particular p=3; Q represents —O—C(O)— and R is as defined previously, in particular R is a group derived from the initiator ROH used for the synthesis of the polymeric side chain from the monomers of cyclic carbonate type.

The grafted monomer units of the comb polymer according to the invention may be of formula (I'-b) below:

[Chem 11]

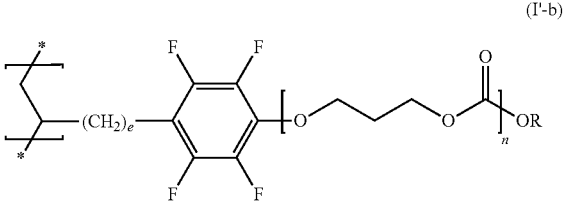

(I'-b)

in which e and n are as defined previously; and R represents a group derived from the initiator ROH used for the synthesis of the polymeric side chain poly(trimethylene carbonate) (PTMC).

Preferably, the side chains formed from monomers of cyclic carbonate type, in particular of poly(trimethylene carbonate) type, of the comb polymer according to the invention have a degree of polymerization of between 5 and 500, in particular between 5 and 200, and preferably between 5 and 75.

In particular, the grafted chains of poly(trimethylene carbonate) type may have a weight-average molar mass of between 510 and 51 000 g·mol$^{-1}$, preferably between 510 and 20 400 g·mol$^{-1}$ and preferably between 510 g·mol$^{-1}$ and 7650 g·mol$^{-1}$.

According to a particular embodiment, the comb polymer according to the invention is formed from a poly(2,3,4,5,6-pentafluorostyrene) main chain, bearing side chains of poly(trimethylene carbonate) type, in particular as defined previously.

According to a particular embodiment, the comb polymer according to the invention contains polymeric side chains formed from monomers of lactone type.

The term "lactone" more particularly means monomers corresponding to the following formula:

[Chem 12]

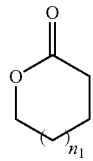

(M4)

in which $n_1$ is an integer ranging from 1 to 9, in particular from 1 to 3;

said monomers being optionally substituted, on one or more of the carbon atoms of the ring, with one or more substituents $R_1$ as defined previously.

An example of a monomer of lactone type that may be mentioned is ε-caprolactone.

A comb polymer according to the invention may more particularly comprise monomer units of the abovementioned formula (I'), in which x is 0 or 1, preferably x=0; q=1; A represents —(CH$_2$)$_p$— with p between 4 and 12, in particular between 4 and 6, in particular p=5; Q represents —C(O)— and R is as defined previously, in particular R is a group derived from the initiator ROH used for the synthesis of the polymeric side chain from the monomers of lactone type.

The grafted monomer units of the comb polymer according to the invention may be of formula (I'-c) below:

[Chem 13]

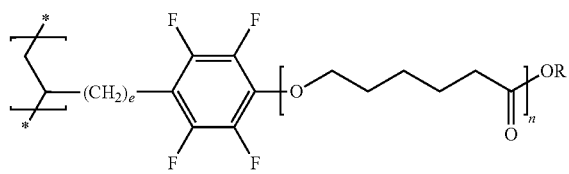

(I'-c)

in which e and n are as defined previously; and R represents a group derived from the initiator ROH used for the synthesis of the polymeric side chain poly(ε-caprolactone) (PCL).

Preferably, the side chains formed from monomers of lactone type, in particular of poly(ε-caprolactone) type, of the comb polymer according to the invention have a degree of polymerization of between 5 and 500, in particular between 5 and 200, and preferably between 5 and 75.

In particular, the grafted chains of poly(ε-caprolactone) type may have a weight-average molar mass of between 570 and 57 000 g·mol$^{-1}$, preferably between 570 and 22 800 g·mol$^{-1}$ and preferably between 570 g·mol$^{-1}$ and 8550 g·mol$^{-1}$.

According to a particular embodiment, the comb polymer according to the invention is formed from a poly(2,3,4,5,6-pentafluorostyrene) main chain, bearing side chains of poly(ε-caprolactone) type, in particular as defined previously.

It is understood that a comb polymer according to the invention may comprise polymeric side chains of different nature, in particular chosen from side chains of poly(ethylene oxide), poly(trimethylene carbonate) and/or poly(ε-caprolactone) type. Preferably, the comb polymer according to the invention contains side chains of the same nature.

Synthesis of the Comb Polymer According to the Invention

The invention also relates to a process for preparing a comb polymer according to the invention, in particular as defined previously, said process proceeding via the formation of polymeric side chains on a polymer of PPFS type, formed from 1-ethenyl- and/or 1-allyl-2,3,4,5,6-pentafluorobenzene monomers.

More particularly, the invention relates to a process for synthesizing a comb polymer according to the invention, comprising at least the steps consisting in:
(i) providing 3 a polymer formed from 1-ethenyl- and/or 1-allyl-2,3,4,5,6-pentafluorobenzene monomers, known as a polymer of PPFS type, intended to form the main chain of the comb polymer; and
(ii) forming the polymeric side chains, in the para position of a portion of the pentafluorophenyl groups of the monomer units of said polymer of PPFS type.

(i) Polymer of PPFS Type

As mentioned previously, the comb polymer according to the invention is formed from a polymer of PPFS type synthesized previously and intended to form the main chain of the comb polymer according to the invention, in particular as described previously.

The polymer of PPFS type is derived from the polymerization of 1-ethenyl- and/or 1-allyl-2,3,4,5,6-pentafluorobenzene monomers, of formula (M1) as defined previously.

The polymer of PPFS type thus corresponds to formula (III) below:

[Chem 14]

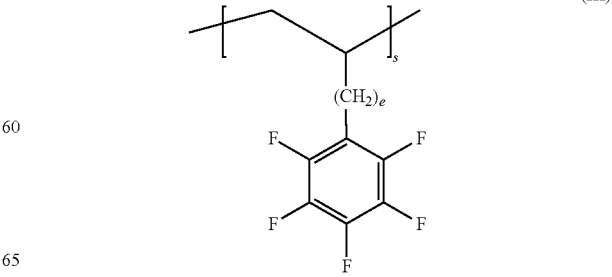

(III)

in which e is 0 or 1;

s represents the number of monomer units in the polymer of PPFS type (corresponding to the degree of polymerization), in particular s is between 25 and 5155, in particular between 50 and 4200, notably between 51 and 510 and preferably between 100 and 520, in particular between 100 and 258.

Preferably, the polymer of PPFS type is a homopolymer, preferably a poly(2,3,4,5,6-pentafluorostyrene).

The polymer of PPFS type, intended to form the main chain, in particular of poly(2,3,4,5,6-pentafluorostyrene) type, may have a number-average molecular mass $M_n$ of between 5000 g·mol$^{-1}$ and 1 000 000 g·mol$^{-1}$, in particular between 10 000 g·mol$^{-1}$ and 100 000 g·mol$^{-1}$ and more particularly between 20 000 g·mol$^{-1}$ and 50 000 g·mol$^{-1}$. In particular, the poly(2,3,4,5,6-pentafluorostyrene) polymer may have a number-average molecular mass of between 9700 g·mol$^{-1}$ and 814 800 g·mol$^{-1}$, in particular between 9700 g·mol$^{-1}$ and 100 880 g·mol$^{-1}$ and more particularly between 12 000 g·mol$^{-1}$ and 50 000 g·mol$^{-1}$.

In particular, it may have a low mass dispersity, notably as defined previously for the main polymer chain of the comb polymer according to the invention.

The polymer of PPFS type may be obtained via synthetic methods known to those skilled in the art. For example, it may be synthesized via a radical polymerization method, in particular via controlled radical polymerization, as described, for example, by Jankova et al. [9].

As an alternative to the processes described in the literature, according to a particularly advantageous embodiment variant, the polymer of PPFS type intended to form the main chain of a comb polymer according to the invention is synthesized via Ziegler-Natta catalysis.

Advantageously, this synthetic variant makes it possible to give polymers with adjustable average molecular masses and dispersities, in good yields.

The polymer of PPFS type may thus be formed by polymerization from a mixture of a Ziegler-Natta catalytic system comprising a catalyst and a cocatalyst; and 1-ethenyl- and/or 1-allyl-2,3,4,5,6-pentafluorobenzene monomers.

This synthetic method more particularly comprises:
placing a Ziegler-Natta catalytic system comprising a catalyst and a cocatalyst in contact with monomers of the abovementioned formula (M1);
exposing the mixture thus formed to stirring and heating conditions suitable for the polymerization of said monomers.

Ziegler-Natta catalytic systems have already been described, for example, for the synthesis of polyolefins ([10]-[12]). The Ziegler-type catalytic system may be of any generation, i.e. 1, 2, 3, 4 or subsequent. Said catalytic system may be supported, homogeneous or heterogeneous.

The Ziegler-Natta catalytic system used for the synthesis of the polymer of PPFS type may comprise:
a catalyst containing a derivative, notably a halide or an alkoxide, of a transition metal from group IV, V or the VI of the Periodic Table of the Elements, preferably chosen from titanium, zirconium, vanadium, cobalt, chromium and nickel; and
a cocatalyst containing a hydride or an alkylated derivative of an element from column 1, 2 or 13 of the Periodic Table of the Elements, and preferably containing a hydride or an alkylaluminum derivative.

According to a particular variant of this embodiment, the catalyst containing a derivative of a transition metal from group IV, V or VI of the Periodic Table of the Elements is chosen from TiCl$_4$, TiCl$_3$, VCl$_3$, VCl$_4$, CoCl$_2$, Ti(OBu)$_4$ and Cr(acac)$_3$.

In particular, the cocatalyst containing a hydride or an alkylated derivative of an element from column 1, 2 or 13 of the Periodic Table of the Elements is chosen from AlEt$_3$, AlEt$_2$Cl, AlEtCl, AlEtCl$_2$, AlBu$_3$, GaEt$_3$ and BeEt$_2$. Preferably, according to this embodiment, the catalytic system is chosen from TiCl$_4$/AlEt$_3$, TiCl$_3$/AlEt$_2$Cl, TiCl$_3$/GaEt$_3$, TiCl$_3$/BeEt$_2$, VCl$_4$/AlEt$_2$Cl, CoCl$_2$/AlEtCl, VCl$_3$/AlEt$_3$, Ti(OBu)$_4$/AlEt$_3$ and Cr(acac)$_3$/AlEt$_3$, and even more preferentially is TiCl$_4$/AlEt$_3$.

Such a Ziegler-Natta catalytic system may be prepared, for example, by adding triethylaluminum to titanium chloride, followed by leaving the mixture to stabilize for 30 minutes.

Alternatively, the Ziegler-Natta catalytic system may comprise:
TiCl$_4$ supported on MgCl$_2$ as catalyst; and
AlEt$_3$ as cocatalyst.

Alternatively, the Ziegler-Natta catalytic system may comprise:
a catalyst chosen from metallocenes; and
a cocatalyst chosen from methylaluminoxane (MAO), Ph$_3$C$^+$B(C$_6$F$_5$)$_4^-$ and B(C$_6$F$_5$)$_3$.

Preferably, according to this embodiment, the catalytic system is chosen from ZrCp$_2$Cl$_2$/MAO, ZrCp$_2$Cl$_2$/B(C$_6$F$_5$)$_3$, ZrCp$_2$Cl$_2$/Ph$_3$C$^+$B(C$_6$F$_5$)$_4^-$, CpTiCl$_3$/MAO and

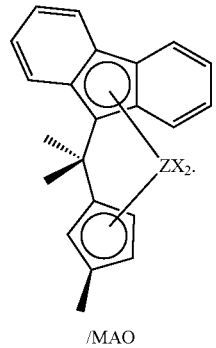

[Chem 15]

According to a preferred embodiment, the catalyst/cocatalyst mole ratio is between 0.3 and 10, preferably between 0.5 and 2.

The contact of a Ziegler-Natta catalytic system, in particular as defined previously, with the monomers of the abovementioned formula (M1) may be performed by simple mixing, in the presence or absence of a solvent such as fluorobenzene or tetrahydrofuran. The monomers (M1)/catalytic system mole ratio may be between 10 and 1000, in particular between 10 and 250.

The mixture is then exposed to stirring and heating conditions suitable for the polymerization of the monomers (M1). In particular, the mixture may be exposed to a temperature stage of between 60° C. and 80° C., notably for a time of at least 10 hours. The stirring may be performed manually or mechanically, in particular using a conventional stirring device.

Preferably, the synthesis of the polymer of PPFS type is followed by a step of neutralizing the catalyst, for example with ethanol, followed by filtering off the catalytic system. The polymer of PPFS type thus formed may be precipitated, for example from methanol.

(ii) Formation of the Polymeric Side Chains

In a step (ii), the polymeric side chains, in particular as defined previously for the comb polymer according to the invention, are formed.

According to a first embodiment variant, the side chains may be formed by grafting, in the para position of a portion of the pentafluorophenyl groups of the monomer units of the polymer of PPFS type, of the polymers that are solvents for alkali metal or alkaline-earth metal salts (solvating polymers), synthesized beforehand.

In this first embodiment variant, the formation of the polymeric side chains in step (ii) of the process of the invention may be performed by placing the polymer of PPFS type in contact with at least one polymer intended to form the polymeric side chains of the comb polymer, and bearing at one of its ends a free hydroxyl (—OH) function, under conditions that are suitable for the grafting of said polymer in the para position of a pentafluorophenyl group.

The polymer intended to form the polymeric side chains of the comb polymer according to the invention may be of formula (IV) below:

[Chem 16]

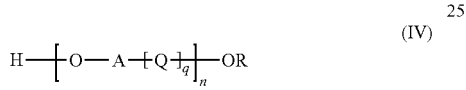

(IV)

in which A, Q, q, n and R are as defined previously.

In particular, the polymer intended to form the polymeric side chains of the comb polymer according to the invention has the formula (IV') below:

[Chem 17]

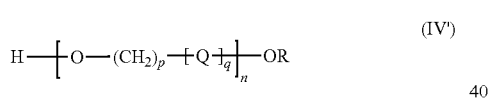

(IV')

in which p, Q, q, n and R are as defined previously.

The polymers intended to form the polymeric side chains of the comb polymer according to the invention may be commercially available, or may be synthesized according to methods known to those skilled in the art.

Preferably, the polymers intended to form the polymeric side chains of the comb polymer according to the invention have a low dispersity. In particular, the mass dispersity, denoted as $D_w$, is preferably between 1 and 2.5, in particular between 1.01 and 1.5.

As described previously, according to a first embodiment variant, the polymer intended to form the polymeric side chains of the comb polymer according to the invention may be a polyalkylene glycol, preferably a polyethylene glycol, bearing only one hydroxyl end (chain end) function, the other end function being a function that is non-reactive with respect to the polymer of PPFS type, preferably a $C_1$-$C_4$ alkyl group, in particular a methyl group.

Such polymers may be synthesized according to methods known to those skilled in the art, or may be commercially available, for example from Sigma-Aldrich.

As described previously, the polyethylene glycol may have a weight-average molar mass of between 200 and 50 000 g·mol$^{-1}$, preferably between 350 and 5000 g·mol$^{-1}$.

According to another embodiment variant, the polymer intended to form the polymeric side chains of the comb polymer according to the invention may be a polymer of at least one cyclic monomer chosen from 5- to 8-membered lactones and cyclic carbonates, in particular as defined previously, and bearing only one free end hydroxyl function. In particular, it may be a poly(trimethylene carbonate) (PTMC) or poly(ε-caprolactone).

These polymers may be synthesized by ring-opening polymerization (ROP), starting with the cyclic monomers, in the presence of at least one "initiator" organic molecule, bearing a hydroxyl function, and optionally in the presence of at least one polymerization reaction catalyst, for example according to the protocol described by Makiguchi et al. [4].

The initiator for the synthesis of the polymer from the cyclic monomers of lactone or cyclic carbonate type is more particularly of formula ROH with R being as defined previously.

The initiator ROH used for the synthesis of the polymer intended to form the polymeric side chains of the comb polymer according to the invention may be chosen, for example, from the following molecules.

[Chem 18]

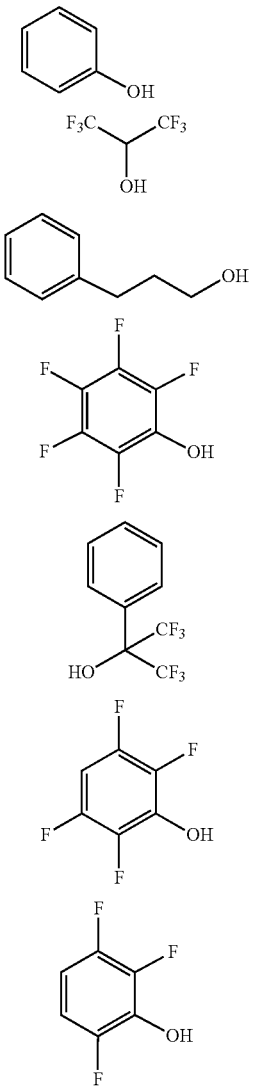

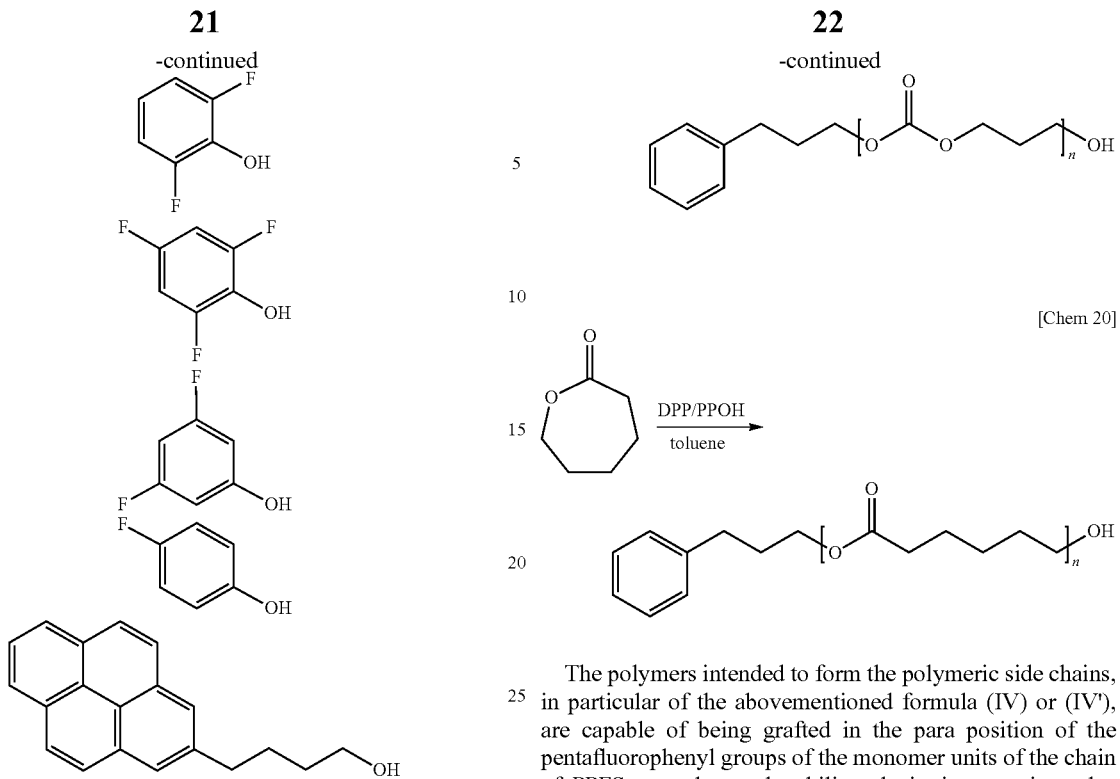

By way of example, the initiator may be the alcohol 3-phenyl-1-propanol.

As described previously, the initiator will be integrated into the chain end of the polymer intended to form the side chains of the comb polymer according to the invention.

The ring-opening polymerization reaction of the monomers of lactone or cyclic carbonate type may advantageously be catalyzed, for example with a catalyst chosen from substituted phosphorus compounds, such as diphenyl phosphate (DPP), or with compounds of metallic type such as tin diethylhexanoate ($Sn(Oct)_2$).

A person skilled in the art is capable of adjusting the operating conditions of the polymerization reaction to obtain the desired polymers, intended to form the polymeric side chains of the comb polymer according to the invention, bearing a free hydroxyl function at one of their ends. The ROP reaction may be performed, for example, at a temperature of between 20 and 110° C., in particular between 40 and 80° C. The reaction may be performed with stirring in solvent medium, for example in one or more apolar and aprotic solvents, such as toluene, or in bulk.

The ROP reactions for the synthesis of polymers intended to form the side chains of the comb polymer according to the invention, of poly(trimethylene carbonate) and poly(ε-caprolactone) type, from the cyclic carbonate monomers of trimethylene carbonate and ε-caprolactone type, and using the alcohol 3-phenyl-1-propanol as initiator, are, for example, represented below.

[Chem 19]

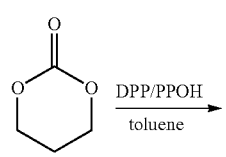

The polymers intended to form the polymeric side chains, in particular of the abovementioned formula (IV) or (IV'), are capable of being grafted in the para position of the pentafluorophenyl groups of the monomer units of the chain of PPFS type, by nucleophilic substitution reaction, also known as a reaction of "para-click" type, between the hydroxyl function borne by said polymers and the fluorine atom in the para position of the pentafluorophenyl groups of the monomer units of the chain of PPFS type. The nucleophilic substitution reaction is regioselective, i.e. only the fluorine atom in the para position of the pentafluorophenyl group is substituted.

These para-click nucleophilic substitution reactions are described, for example, by Delaittre et al. [1].

It may more particularly be performed in basic solvent medium, typically formed from one or more polar aprotic solvents, in particular chosen from tetrahydrofuran (THF), amides such as N,N-dimethylacetamide (DMAc), N,N-dimethylformamide (DMF), N-methyl-2-pyrrolidone (NMP); methyl ethyl ketone (MEK), N-methyl-2-pyrrolidone and mixtures thereof, preferably in tetrahydrofuran (THF), to which is added at least one strong base, for example an alkali metal hydroxide which may notably be sodium or potassium hydroxide.

It falls to a person skilled in the art to adjust the operating conditions to perform the "para-click" reaction for the grafting of the polymeric side chains, notably with regard to the desired degree of grafting.

In particular, the grafting reaction may be performed at temperatures of between 50° C. and 150° C., in particular between 66° C. and 100° C. The reaction time may be between 12 hours and 72 hours, in particular between 24 hours and 48 hours.

By way of example, the mixture, comprising the polymer intended to form the side chains of the comb polymer according to the invention, the polymer of PPFS type intended to form the main chain of the comb polymer according to the invention, in the basic solvent medium, may be brought to reflux, with stirring.

According to another embodiment variant, the polymeric side chains may be formed by performing the polymerization of the side chains directly on the polymer of PPFS type.

In the context of this embodiment variant, the formation of the polymeric side chains in step (ii) of the process of the invention may comprise at least the following steps:
(a) substituting the fluorine atoms in the para position of the pentafluorostyrene groups of a portion of the monomer units of the polymer of PPFS type with groups bearing a free hydroxyl (—OH) function; and
(b) placing said polymer of PPFS type thus functionalized with hydroxyl side functions in contact with precursor monomers of the polymeric side chain, under conditions that are suitable for the polymerization of said monomers.

More particularly in a first step (a), a portion of the monomer units of the polymer of PPFS type is modified to graft in the para position of the pentafluorostyrene groups hydroxyl (—OH) side functions.

The functionalization of the monomer units with hydroxyl functions may more particularly be performed by "paraclick" nucleophilic substitution reaction as described previously, in particular by reacting the polymer of PPFS type intended to form the main chain of the comb polymer according to the invention with an alkali metal hydroxide, notably sodium or potassium hydroxide, and preferably with potassium hydroxide (KOH) or with a compound of diol type bearing two free hydroxyl (—OH) functions.

Preferably, the compound of diol type corresponds to the formula HO-E-OH, with E representing a $C_1$ to $C_6$ alkylene group. It may be, for example, methanediol or ethylene glycol.

In a second step (b), the polymeric side chains are polymerized directly in the para position of the pentafluorostyrene groups functionalized in the para position with hydroxyl side functions, by placing the modified polymer, obtained on conclusion of step (a), in contact with precursor monomers of said polymeric side chain, under conditions that are suitable for the polymerization of said monomers.

It falls to a person skilled in the art to adjust the operating conditions to perform the polymerization of the desired side chains. Thus, the polymerization is typically performed in the presence of at least one catalyst, for example of alkaline type, such as sodium hydroxide, potassium hydroxide or sodium carbonate, for the growth of PEO chains, or alternatively a phosphorus-based catalyst, such as DPP, for the ring-opening polymerization of the monomers of lactone or cyclic carbonate type, for example for the formation of the side chains of PTMC or PCL type.

The side chains formed are then subjected to a termination reaction, in particular for termination of the chains grafted with groups R as described previously.

It should be understood that a person skilled in the art is capable of adjusting the synthetic conditions, in particular according to one or other of the abovementioned variants, to obtain a comb polymer having the desired properties, in particular as described previously.

In particular, the proportions of said polymer of PPFS type intended to form the main chain of the comb polymer according to the invention and of the polymer or of said precursor monomers, intended to form said polymeric side chains, are preferably adjusted so as to obtain the desired degree of molar grafting of polymeric side chains, preferably between 50% and 95%.

The comb polymer, obtained on conclusion of the grafting reaction of the solvating polymers on the monomer units of the polymer of PPFS type, may be subjected to one or more purification steps, for example by precipitation from ether and then from water.

The polymer material obtained, formed from the comb polymers according to the invention, is advantageously in elastic solid form at room temperature. More particularly, the comb polymers according to the invention are arranged in the form of a three-dimensional network of entangled polymers, have a viscoelastic behavior, reflected by the existence of a rubbery plateau, in particular for temperatures above −50° C.

Solid Electrolyte

As mentioned previously, the comb polymers according to the invention may be used, in combination with at least one ionic salt, to form a solid electrolyte, in particular in an electrochemical system, notably in a lithium battery.

Thus, according to another of its aspects, the invention also relates to a solid polymer electrolyte comprising at least one comb polymer according to the invention, as defined previously, and at least one alkali metal or alkaline-earth metal salt. In particular, the polymer electrolyte according to the invention may be formed from at least one comb polymer according to the invention and from at least one alkali metal or alkaline-earth metal salt.

In particular, the polymeric network formed from the comb polymers according to the invention forms more than 50% by mass, in particular more than 75% by mass, of the total mass of said solid electrolyte.

Advantageously, the solid polymer electrolyte film according to the invention is free of plasticizers, such as carbonates, for example ethylene carbonate or diethyl carbonate.

In particular, the solid electrolyte film according to the invention is different from an electrolyte of gelled type, comprising a predominant amount of plasticizer.

Preparation of the Solid Electrolyte According to the Invention

According to another of its aspects, the invention also relates to a process for preparing a solid electrolyte film, comprising at least the following steps:
(i) mixing at least one comb polymer according to the invention, as described previously, and at least one alkali metal or alkaline-earth metal salt, in the presence or absence of a solvent medium; and
(ii) forming, in particular on the surface of a substrate, a film from said mixture.

The film is more particularly formed on the surface of a suitable substrate, which is in particular inert under the conditions for forming the solid electrolyte film, and is then optionally detached from said substrate to be used in the electrochemical system for which it is intended, in particular to be transferred onto at least one electrode.

The substrate may be of diverse nature. It may be made of glass, alumina, silicone, polyimide, polytetrafluoroethylene (PTFE), polyethylene terephthalate (PET), silicone or polypropylene.

The alkali metal or alkaline-earth metal salt is used with the comb polymer according to the invention to ensure ion conduction.

In the context of the invention, the following definitions apply:
"alkali metals": the chemical elements from the first column of the Periodic Table of the Elements, more particularly chosen from lithium, sodium, potassium, rubidium and cesium. Preferably, the alkali metal is lithium, sodium or potassium, and more preferentially lithium;
"alkaline-earth metals": the chemical elements from the second column of the Periodic Table of the Elements, more particularly chosen from beryllium, magnesium, calcium, strontium, barium and radium. Preferably, the alkaline-earth metal is magnesium or calcium.

The alkali metal salt may be, for example, a lithium salt or a sodium salt; the alkaline-earth metal salt may be, for example, a magnesium salt.

Examples of lithium salts that may be mentioned include $LiPF_6$, $LiClO_4$, $LiBF_4$, $LiAsF_6$, $LiCF_3SO_3$, $LIN(C_2F_5SO_2)_2$, lithium bistrifluoromethylsulfonylimide $LiN[SO_2CF_3]_2$ (known by the abbreviation LiTFSI), lithium bis(fluorosulfonyl)amide (known by the abbreviation LiFSI) $LiN[SO_2F]_2$, lithium 4,5-dicyano-2-(trifluoromethyl)imidazole (known by the abbreviation LiTDI), lithium bispentafluoroethylsulfonylimide (known by the abbreviation LiBETI), lithium bis(oxalato)borate (known by the abbreviation LiBOB) and lithium difluoro(oxalato)borate (known by the abbreviation LiFOB), and mixtures thereof.

Preferably, the electrolyte includes, as lithium salt, LiTFSI or LiFSI, preferably LiTFSI. It falls to a person skilled in the art to adjust the amount of alkali metal or alkaline-earth metal salts, notably with regard to the nature of the comb polymer, and notably the nature of the polymeric side chains borne by the comb polymer, used according to the invention.

In the case of using a comb polymer bearing side chains of polyalkylene glycol type, in particular polyethylene glycol, the amounts of comb polymers according to the invention and of lithium salt(s) may advantageously be adjusted so that the O/Li mole ratio is between 6 and 24, advantageously between 8 and 16, in particular between 14 and 16 and more particularly about 16.

In the case of using a comb polymer bearing side chains formed from monomers of lactone type, in particular of poly(ε-caprolactone) type, the amounts of comb polymers according to the invention and of lithium salt(s) may advantageously be adjusted so that the $CO_2/Li$ mole ratio is between 0.5 and 20, advantageously between 1 and 5, in particular between 1 and 3 and more particularly about 1.

In the case of using a comb polymer bearing side chains formed from monomers of cyclic carbonate type, in particular of poly(trimethylene carbonate) type, the amounts of comb polymers according to the invention and of lithium salt(s) may advantageously be adjusted so that the $CO_3/Li$ mole ratio is between 0.5 and 20, advantageously between 1 and 5, in particular between 1 and 3 and more particularly about 1.

The mixing of the comb polymer according to the invention and of said alkali metal or alkaline-earth metal salt is more particularly performed under conditions enabling good dispersion of said alkali metal or alkaline-earth metal salt in the polymer network formed from the comb polymers according to the invention. The mixing may be performed in the presence or absence of a solvent.

A solid electrolyte film according to the invention may thus be prepared either via the approach using a solvent medium (referred to hereinbelow as the "solvent route"), or via the approach using the molten polymer, in the absence of solvent (referred to hereinbelow as the "melt route").

According to a first embodiment variant, the solid electrolyte film is prepared via the "solvent" route.

In the context of this variant, the mixing in step (i) of said comb polymer according to the invention and of the alkali metal or alkaline-earth metal salt is more particularly performed in a solvent medium. The solvent medium may be formed from one or more polar organic solvents.

By way of example, they may be chosen from acetone, tetrahydrofuran (THF) and mixtures thereof.

Preferably, the mixture in step (i) is heated to a temperature below 100° C. In particular, the mixing is performed at a temperature of greater than or equal to 25° C., in particular between 40 and 60° C.

The solid electrolyte film is then formed in step (ii) via at least the steps consisting in (ii-a) depositing the formulation from step (i) on the surface of the substrate, for example by coating, and (ii-b) evaporating off said solvent(s) under conditions suitable for forming a dry solid film.

The term "dry" means that the film comprises less than 5% by mass of solvent, in particular less than 2% by mass and more particularly less than 1% by mass of solvent. This synthetic route has the advantage of being easy to use and of not requiring any sophisticated equipment. However, when it is intended to be performed on a large scale, this route poses management difficulties as regards the volumes of solvent used and the safety problems inherent in solvent vapors.

According to another embodiment variant, the solid electrolyte film is prepared in the absence of solvent, via the "melt" route, notably by extrusion.

In the context of this embodiment variant, the mixing may more particularly be performed by heating to a temperature above Tg+30° C., where Tg is the glass transition temperature of the comb polymer.

In particular, the mixing is performed at a temperature of greater than or equal to −40° C., in particular between 20° C. and 80° C.

The molten mixture may then be formed into a film, which is supported with a substrate or self-supported, via any melt-route extrusion technique known to those skilled in the art.

Electrochemical System

The solid electrolyte according to the invention may be used in an electrochemical system, for example for a lithium battery.

According to yet another of its aspects, the present invention thus relates to an electrochemical system comprising a solid electrolyte according to the invention.

The electrochemical system may be an electrochemical generator, converter or storage system. It may more particularly be a fuel cell, for example a proton exchange membrane fuel cell (PEMFC); a primary or secondary battery, for example a lithium, sodium, magnesium, potassium or calcium battery; a lithium-air or lithium-sulfur accumulator.

According to a particular embodiment, the solid electrolyte is used in a battery, in particular a lithium battery, notably a lithium-ion or lithium-metal battery.

The solid electrolyte according to the invention may be more particularly used as separator electrolyte in an electrochemical system. The term "separator electrolyte" means a solid electrolyte film positioned between the positive and negative electrodes of an electrochemical system, and acting both as an ion conductor and as a separator between the positive and negative electrodes.

The production of the desired electrochemical system incorporating the separator electrolyte according to the invention falls within the competence of a person skilled in the art. In particular, the assembly formed from the electrodes and the solid separator electrolyte film may be obtained by assembling the various elements and hot-pressing, for example at a temperature of between 25 and 150° C.

The solid electrolyte film may have a thickness of between 1 and 100 μm, in particular between 5 and 50 μm and more particularly about 15 μm.

By way of example, a lithium accumulator may be formed, in a conventional manner, from two electrodes, namely a positive electrode and a negative electrode.

The positive electrode generally comprises, as electrochemically active material, lamellar compounds such as $LiCoO_2$, $LiNiO_2$ and mixtures $Li(Ni, Co, M_n, Al)O_2$ or compounds of spinel structure having compositions close to $LiMn_2O_4$, or lithium phosphates, in particular $LiFePO_4$.

The negative electrode generally comprises, as electrochemically active material, lithium metal in the case of primary accumulators, or intercalation materials such as graphite carbon, or lithium titanium oxide ($Li_4T_{15}O_{12}$) in the case of accumulators based on lithium-ion technology.

current collectors, generally made of copper for the negative electrode, or of aluminum for the positive electrode, which allow the circulation of electrons, and thus electron conduction, in the external circuit.

Preferably, the current collector for the positive electrode is made of aluminum protected against the corrosion due to the lithium salt, for example aluminum covered with a carbon-charged polymer layer.

the solid polymer electrolyte according to the invention in which the ion conduction takes place, which ensures the passage of the lithium ions from one electrode to the other, and which also acts as separator, for preventing contact between the positive and negative electrodes.

It may in particular be a lithium metal battery, comprising a lithium metal anode and a cathode comprising at least one positive-electrode active material, between which is a solid electrolyte according to the invention.

The invention will now be described by means of the examples and figures that follow, which are, needless to say, given as nonlimiting illustrations of the invention.

EXAMPLE

Example 1

Preparation of the poly(2,3,4,5,6-pentafluorostyrene) comb polymer Bearing poly(ethylene oxide) Grafts ("PPFS$_{49k}$-g-PEO$_{0.35k}$")

495 mg of poly(2,3,4,5,6-pentafluorostyrene) (denoted as PPFS) with a number-average molecular mass of 49 kg·mol$^{-1}$; 5.078 g of PEO monomethyl ether of 350 g·mol$^{-1}$ and 380 mg of KOH are added to 20 mL of tetrahydrofuran (THF). The medium is stirred at reflux for 24 hours. The medium is then precipitated from ether, and then from water to give a viscous violet-colored polymer.

1H NMR: (400 MHz; THF-d$_8$; 298 K): δ ppm 2.1; 2.5; 2.9; 3.3; 3.5; 3.8

$^{19}$F NMR: (400 MHz; THF-d$_8$; 298 K): δ ppm −144; −158; −164

According to the fluorine NMR spectrum, the degree of grafting with PEO side chains is greater than 75%.

The infrared spectra of the PPFS and of the comb polymer PPFS$_{49k}$-g-PEO$_{0.35k}$ are shown in FIG. 1.

Preparation of the Electrolyte and Electrochemical Properties

The viscous polymer (201.9 mg) is mixed with lithium salt LiTFSI (46.1 mg) in anhydrous acetone at 56° C.

After evaporation and then drying, the solid electrolyte is deposited on lithium metal foil and incorporated into an Li/electrolyte/Li symmetrical button cell for determination of its electrochemical properties. The experiment is repeated for three identical button cells.

Figure 2:
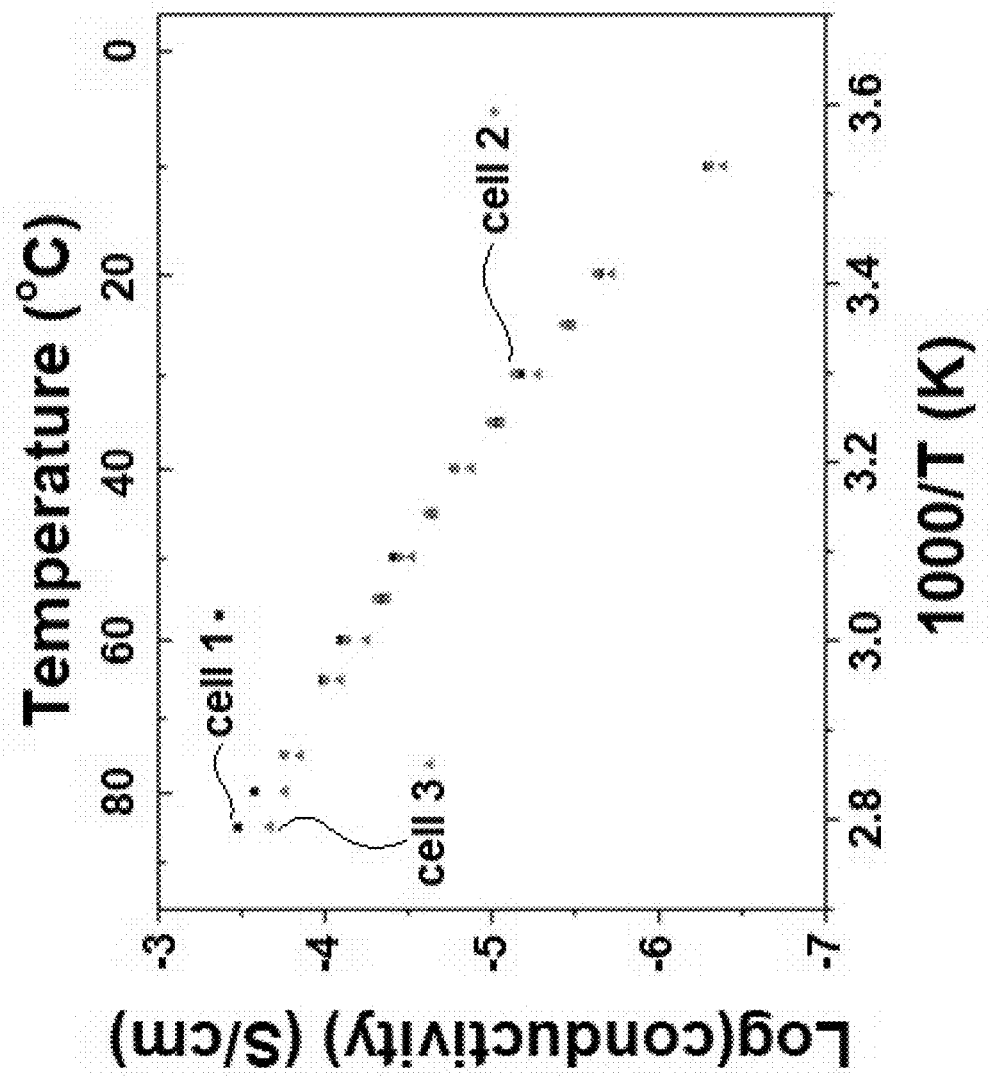
FIG. 2 shows the change in ion conductivity (in $S \cdot cm^{-1}$) as a function of the temperature (T in ° C., and 1000/T, T being expressed in degrees Kelvin) for the solid electrolyte based on the comb polymer $PPFS_{49k}$-8-$PEO_{0.35k}$ prepared according to example 1.

FIG. 2 shows the change in ion conductivity as a function of the temperature.

Electrochemical tests are performed in galvanostatic cycling, at different current densities in stages of 4 hours at a temperature of 40° C.

Figure 3:
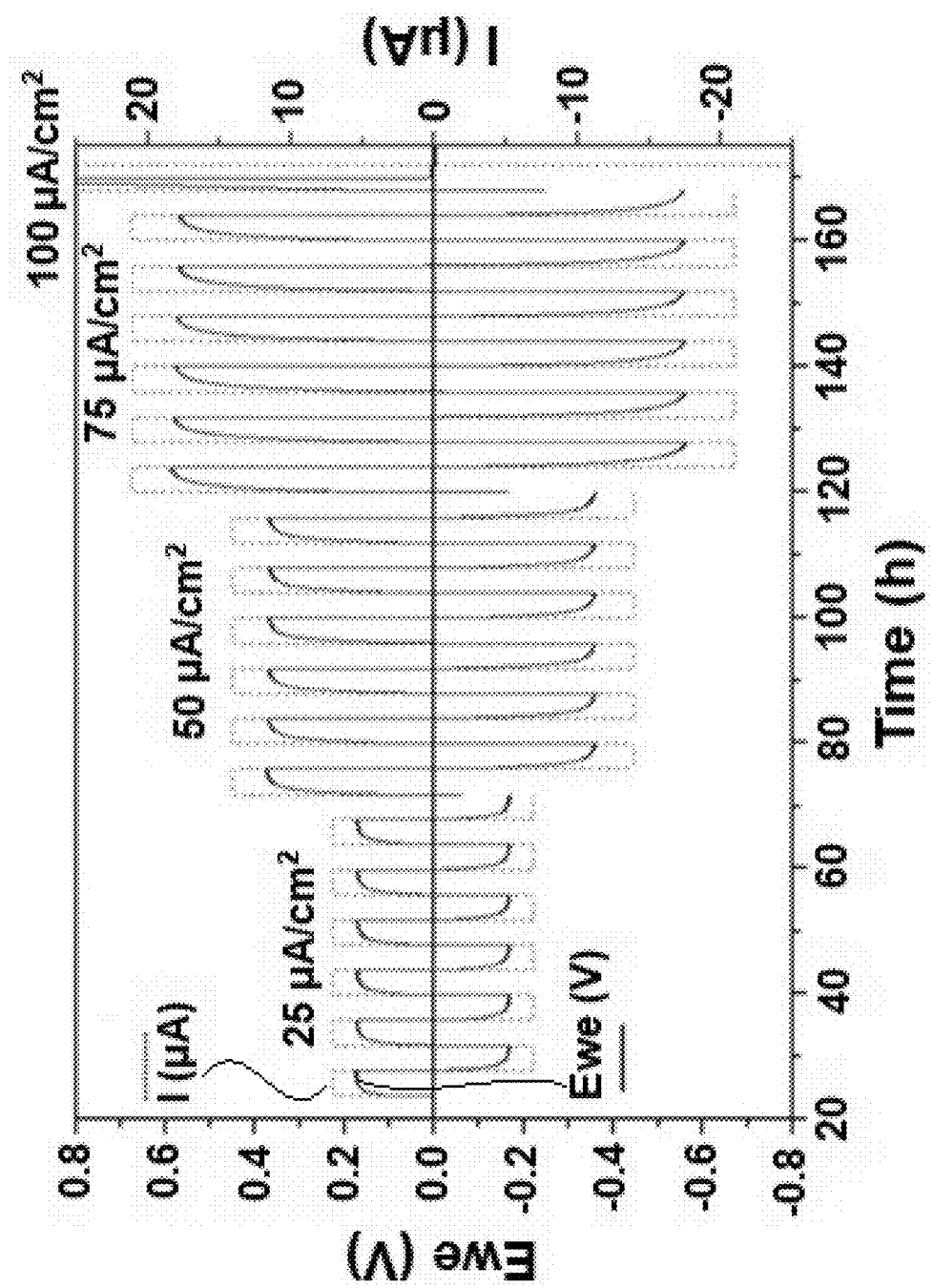
FIG. 3 represents the cycling curves in an Li0/electrolyte/Li symmetrical cell, using the electrolyte based on the comb polymer PPFS$_{49k}$-g-PEO$_{0.35k}$ prepared according to example 1.

The cycling curves obtained with the electrolyte based on the comb polymer PPFS$_{49k}$-g-PEO$_{0.35k}$ are shown in FIG. 3.

Figure 4:
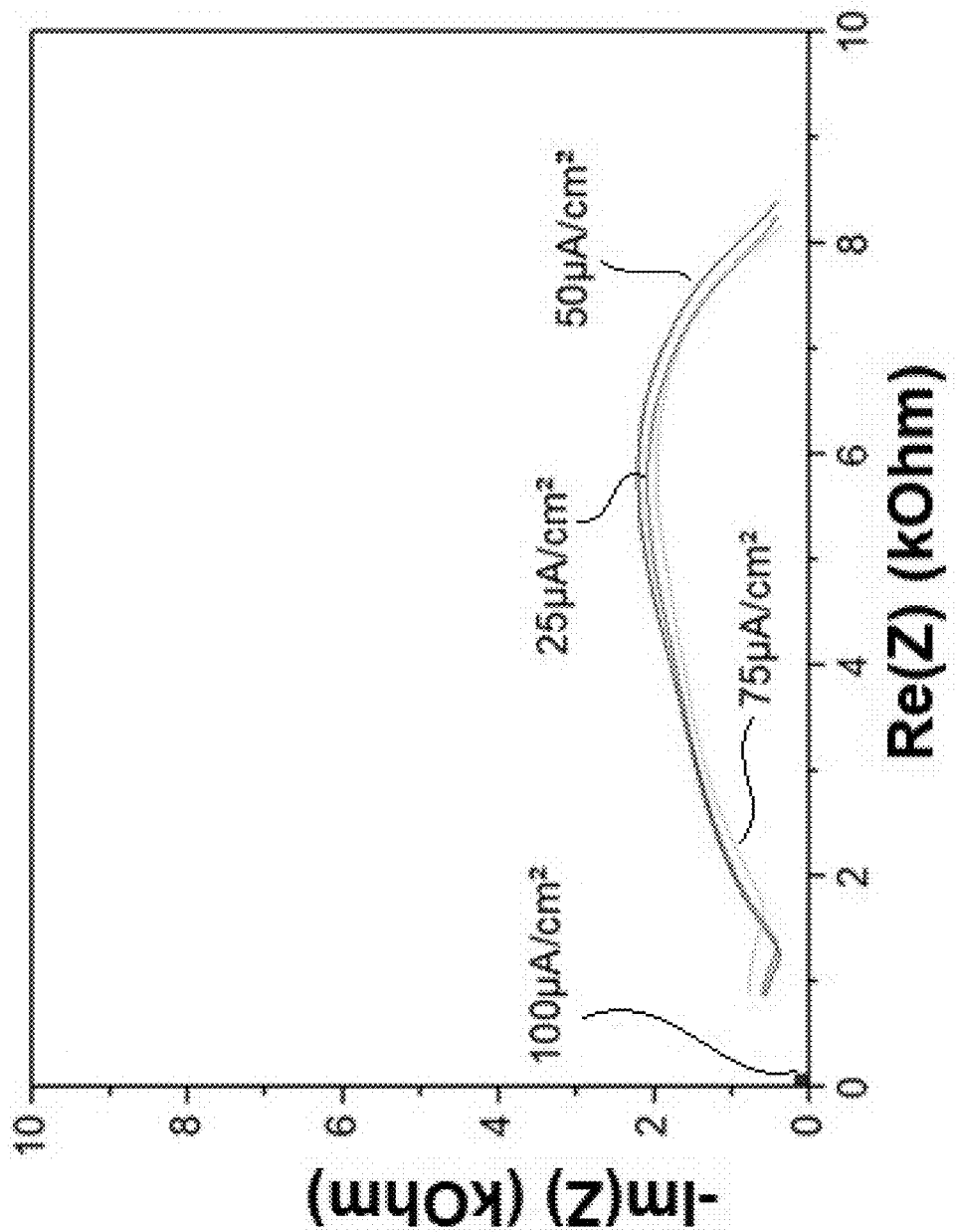
FIG. 4 represents the Nyquist diagrams (Im(Z) as a function of Re(Z)) obtained by impedance spectroscopy for the button cell prepared according to example 1, at various current densities.

The electrochemical behavior is also evaluated by impedance spectroscopy. The Nyquist diagrams obtained after cycling, for variable current densities, are shown in FIG. 4. They reveal good stability of the solid electrolyte/lithium interfaces during cycling and homogeneous reversible electrodeposition of the lithium metal on the surface of the electrode during cycling.

Example 2

Preparation of Poly(2,3,4,5,6-Pentafluorostyrene) Comb Polymers Bearing Poly(Ethylene Oxide) Grafts ("PPFS-g-PEO")

2.1. Synthesis of the comb polymer PPFS$_{49k}$-g-PEO$_{0.75k}$ 1.5 mg of PPFS (49 kg·mol$^{-1}$), 11.5 g of PEO monomethyl ether (750 g·mol$^{-1}$) and 500 mg of KOH are added to 50 mL of THF. The medium is stirred at reflux for 48 hours. The medium is then precipitated from ether, and then from water to give a solid which has rubber-type viscoelastic behavior.

2.2. Synthesis of the Comb Polymer PPFS$_{39k}$-g-PEO$_{0.35k}$ 1.504 g of PPFS (39 kg·mol$^{-1}$), 5.460 g of PEO monomethyl ether (350 g·mol$^{-1}$) and 583 mg of KOH are added to 50 mL of THF. The medium is stirred at reflux for 48 hours. The medium is then precipitated from water to give a violet-colored polymer which has rubber-type viscoelastic behavior.

2.3. Synthesis of the Comb Polymer PPFS$_{39k}$-g-PEO$_{0.75k}$ 1.5006 g of PPFS (39 kg·mol$^{-1}$), 11.712 g of PEO monomethyl ether (750 g·mol$^{-1}$) and 562 mg of KOH are added to 70 mL of THF. The medium is stirred at reflux for 48 hours. The medium is then precipitated from ether and then from water to give a violet-colored polymer which has rubber-type viscoelastic behavior.

Preparation of the Electrolyte and Electrochemical Properties

After physical mixing (in a glass vial) of these polymers with LiTFSI (172.6 mg of PPFS$_{49k}$-g-PEO$_{0.75k}$+32.1 mg of LiTFSI; 203.2 mg of PPFS$_{39k}$-g-PEO$_{0.35k}$+41.3 mg of LiTFSI; 198.3 mg of PPFS$_{39k}$-g-PEO$_{0.75k}$+38.3 mg of LiTFSI) in hot acetone (56° C.), evaporation of the solvent and then drying, the electrolytes obtained are formed (by means of a hot press (100° C.) in the case of the solids) and then introduced into a spacer (stainless steel)/electrolyte/spacer (stainless steel) symmetrical button cell to determine their conductivity by EIS ("Electrochemical Impedance Spectroscopy").

Figure 5:
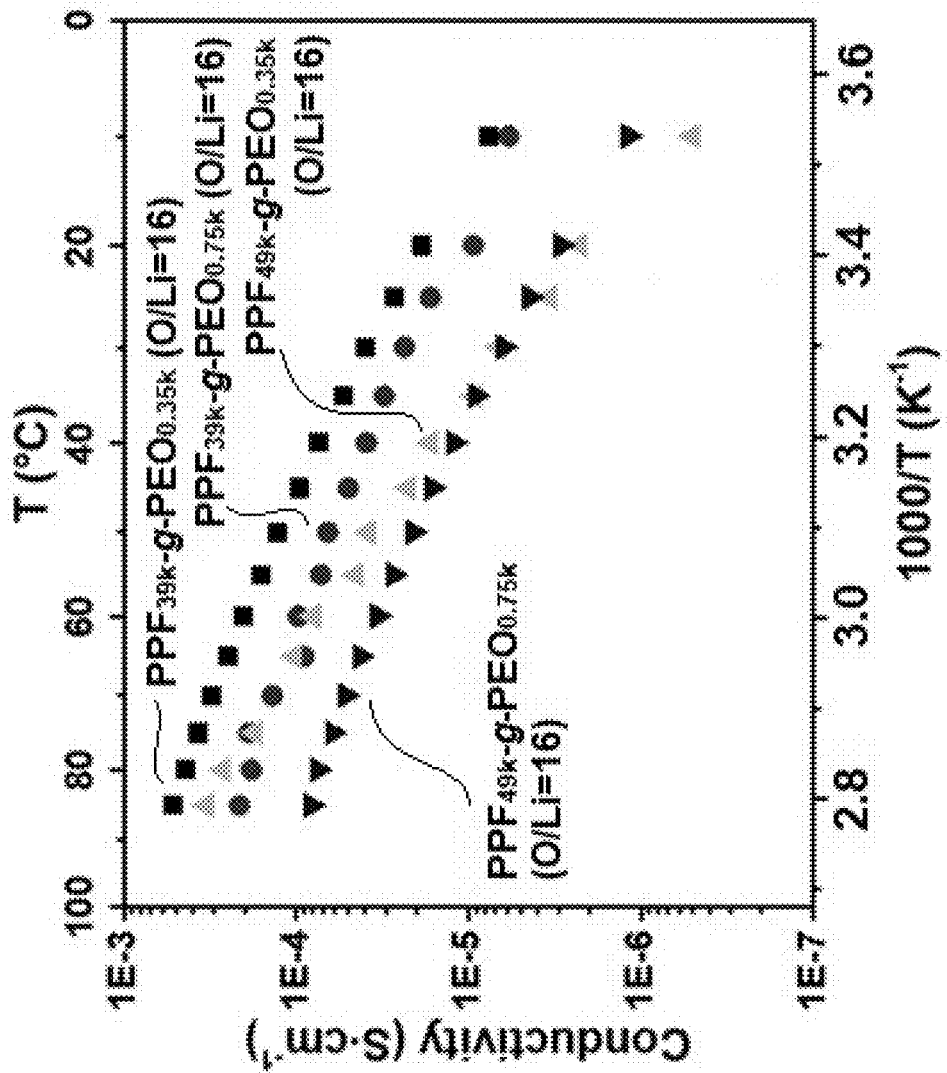
FIG. 5 represents the change in ion conductivity (in S·cm$^{-1}$) as a function of the temperature, for the various electrolytes according to the invention based on comb polymers of PPFS-g-PEO type prepared in examples 1 and 2.

FIG. 5 shows the change in ion conductivity as a function of the temperature for the electrolytes prepared in examples 1 and 2.

Figure 6:
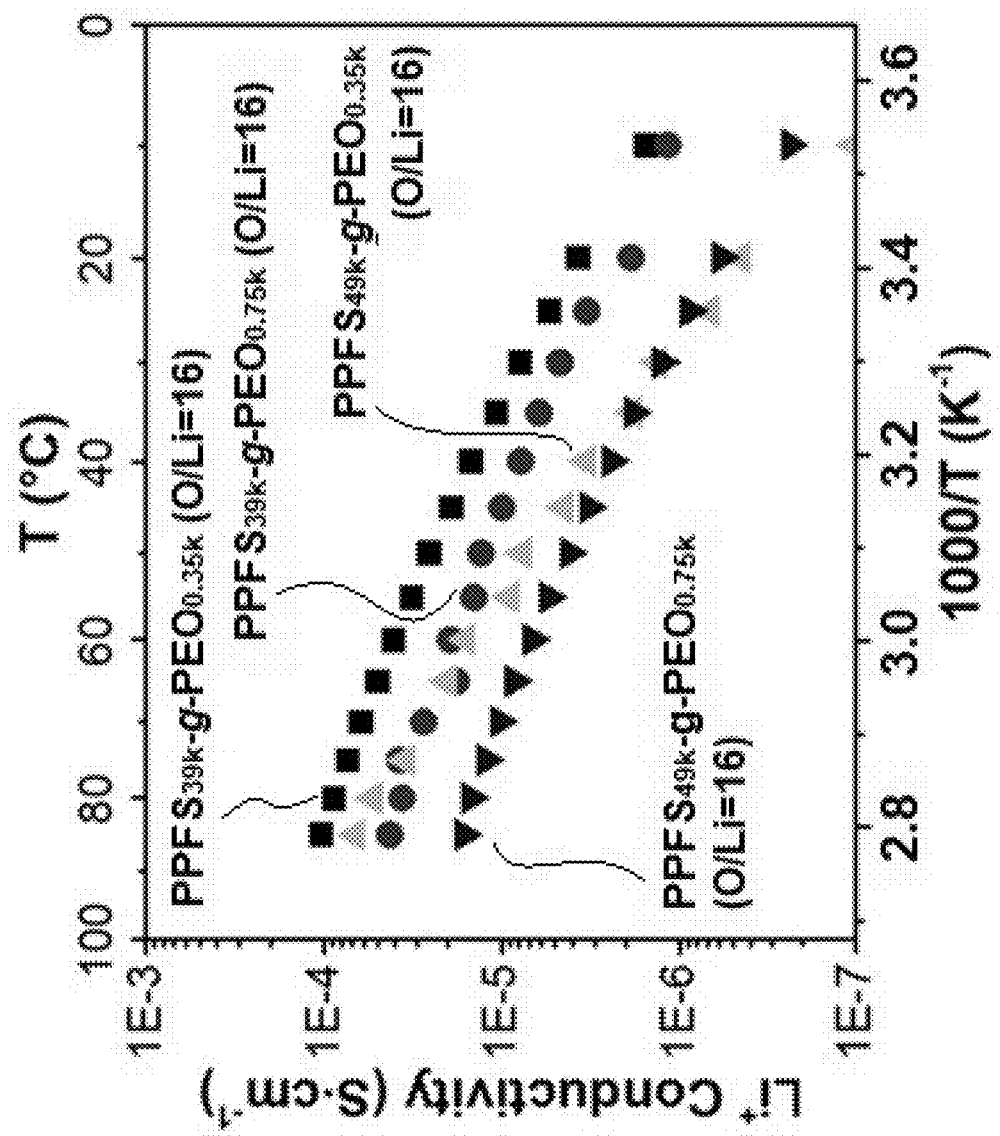
FIG. 6 represents the contribution of the Li$^+$ ion to the ion conductivity for the various electrolytes according to the invention based on comb polymers of PPFS-g-PTMC type prepared in examples 1 and 2.

FIG. 6 shows the contribution of the Li$^+$ ion to the ion conductivity. This contribution may be evaluated from the Li$^+$ ion transference number, denoted as $t_{Li+}$, according to the equation $\sigma_{Li+}=\sigma \times t_{Li+}$, with $\sigma_{Li+}$ being the conductivity of the Li$^+$ ion and σ being the total conductivity.

The lithium transference number of an electrolyte may be determined according to the known Bruce-Vincent method. It notably depends on the nature of the polymeric side chains used in the comb polymer of the invention.

Example 3

Preparation of Poly(2,3,4,5,6-Pentafluorostyrene) Comb Polymers Bearing Poly(Trimethylene Carbonate) Grafts ("PPFS-g-PTMC")

3.1. Synthesis of the Comb Polymer $PPFS_{49k}$-g-$PTMC_{5k}$ 100 mg of PPFS (49 kg·mol$^{-1}$), 3 g of PTMC (5 kg·mol$^{-1}$) and 380 mg of KOH are added to 20 mL of THF. The medium is stirred at reflux for 24 hours. The medium is then precipitated from water and then purified by semi-preparative size exclusion chromatography.

3.2. Synthesis of the Comb Polymer $PPFS_{39k}$-g-$PTMC_{2.2k}$ 495 mg of PPFS (39 kg·mol$^{-1}$), PTMC (2200 g·mol$^{-1}$) and 380 mg of KOH are added to 20 mL of THF. The medium is stirred at reflux for 24 hours. The medium is then precipitated from water and then purified by semi-preparative size exclusion chromatography.

Preparation of the Electrolyte and Electrochemical Properties

After physical mixing of these polymers with LiTFSI in hot acetone (641 mg of $PPFS_{49k}$-g-$PTMC_{5k}$+136.3 mg of LiTFSI; 275.5 mg of $PPFS_{39k}$-g-$PTMC_{2.2k}$+55.4 mg of LiTFSI)) (56° C., evaporation and then drying, the electrolytes obtained are introduced into a spacer (stainless steel)/electrolyte/spacer (stainless steel) symmetrical button cell to determine their conductivity by EIS ("Electrochemical Impedance Spectroscopy").

Figure 7:
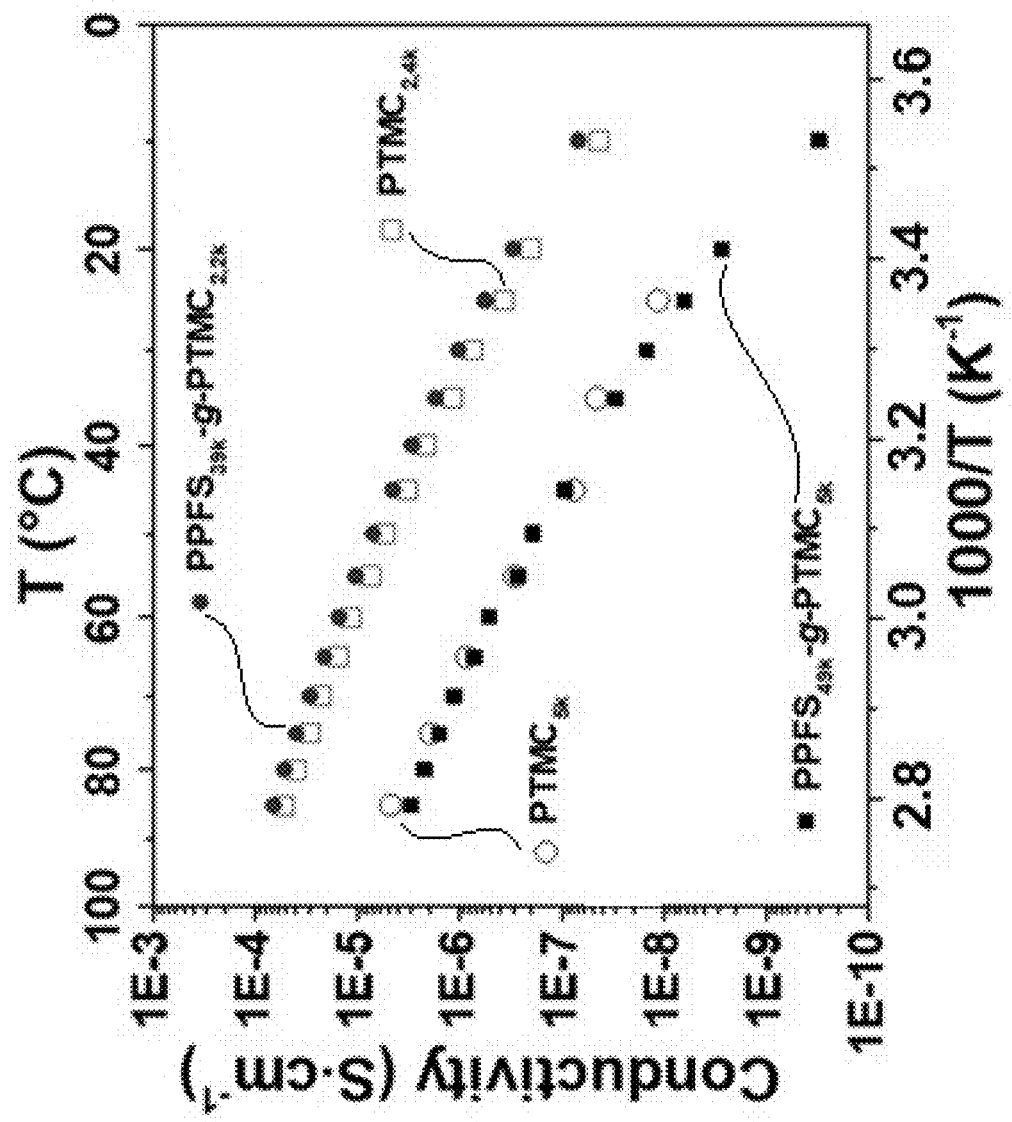
FIG. 7 represents the change in ion conductivity (in S·cm$^{-1}$) as a function of the temperature, for the various electrolytes according to the invention based on comb polymers of PPFS-g-PTMC type prepared in example 3, and for electrolytes based on PTMC$_{2.4k}$ and PTMC$_{5k}$ outside the invention.
Figure 8:
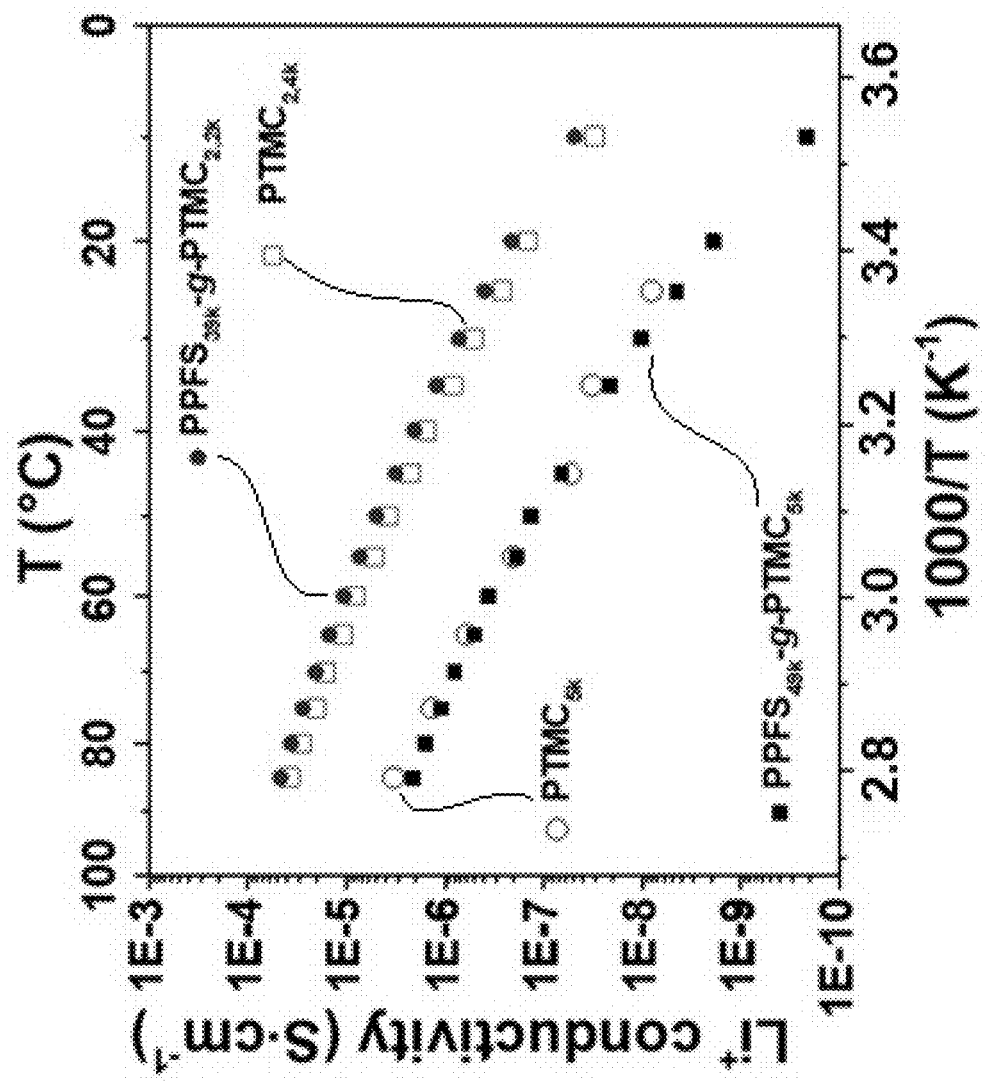
FIG. 8 represents the contribution of the Li$^+$ ion to the ion conductivity for the various electrolytes according to the invention based on comb polymers of PPFS-g-PTMC type prepared in examples 3, and for electrolytes based on PTMC$_{2.4k}$ and PTMC$_{5k}$ outside the invention.

FIG. 7 shows the change in ion conductivity as a function of the temperature for the electrolytes based on the comb polymers $PPFS_{49k}$-g-$PTMC_{5k}$ and $PPFS_{39k}$-g-$PTMC_{2.2k}$ according to the invention. The change in ion conductivity as a function of the temperature for electrolytes based on $PTMC_{2.4k}$ and $PTMC_{5k}$ is also shown for comparative purposes. FIG. 8 shows the contribution of the Li$^+$ ion to the ion conductivity, evaluated from the Li$^+$ ion transference number.

Example 4

Preparation of Poly(2,3,4,5,6-Pentafluorostyrene) Comb Polymers Bearing Poly(Ethylene Oxide) Grafts ("PPFS-g-PEO")

4.1. Synthesis of $PPFS_{170k}$-g-$PEO_{0.35k}$

PPFS ($M_n$=170 kg·mol$^{-1}$, $D_w$=5.2, 1 equivalent of PFS units), PEO methyl ether (350 g·mol$^1$, 1.1 equivalents) and KOH (1.1 equivalents) are dissolved in THF; the medium is stirred at reflux for 48 hours. At the end of the reaction, the reaction medium is precipitated from water. The THF is evaporated off on a rotary evaporator to limit the solubility of the product in the precipitation medium. The solution is subsequently cooled and then centrifuged to separate the water from the product. The supernatant is then discarded. This operation is repeated three times. After drying (at 100° C. for a minimum of 48 hours under a primary dynamic vacuum (P≈10$^{-1}$ mbar)), the comb copolymer is obtained in the form of a rubbery violet-colored solid.

1H NMR (THF-d$_5$): δ=2.0 ppm (s, 2H, (Ar)CH—CH$_2$—); 2.5-2.8 ppm (1H, (Ar)CH—CH$_2$—); 1.9 ppm (s, 3H, O—CH$_3$); 3.6 ppm (4H, O—CH$_2$CH$_2$—O); 3.8 ppm (2H, CH$_2$CH$_2$—O—CH$_3$); 4.3 ppm (2H, Ar—O—CH$_2$)

$^{19}$F NMR (THF-d$^5$): δ=−144 ppm (ortho aromatics); −158 ppm (para| meta aromatic of grafted units); −164 ppm (meta aromatics of the non-grafted units)

4.2. Synthesis of $PPFS_{170k}$-g-$PEQ_{0.55k}$

PPFS ($M_n$=170 kg·mol$^{-1}$, $D_w$=5.2, 1 equivalent of PFS units), PEO methyl ether (550 g·mol$^1$, 1,1 equivalents) and KOH (1.1 equivalents) are dissolved in THF; the medium is stirred at reflux for 48 hours. At the end of the reaction, the reaction medium is precipitated from water. The THF is evaporated off on a rotary evaporator to limit the solubility of the product in the precipitation medium. The solution is subsequently cooled and then centrifuged to separate the water from the product. The supernatant is then discarded. This operation is repeated three times. After drying (at 100° C. for a minimum of 48 hours under a primary dynamic vacuum (P≈10$^{-1}$ mbar)), the comb copolymer is obtained in the form of a rubbery violet-colored solid.

4.3. Synthesis of $PPFS_{170k}$-g-$PEO_{0.75k}$

PPFS ($M_n$=170 kg·mol$^{-1}$, $D_w$=5.2, 1 equivalent of PFS units), PEO methyl ether (750 g·mol$^1$, 1.1 equivalents) and KOH (1.1 equivalents) are dissolved in THF; the medium is stirred at reflux for 48 hours. At the end of the reaction, the reaction medium is precipitated from water. The THF is evaporated off on a rotary evaporator to limit the solubility of the product in the precipitation medium. The solution is subsequently cooled and then centrifuged to separate the water from our product. The supernatant is then discarded. This operation is repeated three times. After drying (at 100° C. for a minimum of 48 hours under a primary dynamic vacuum (P≈10$^{-1}$ mbar)), the comb copolymer is obtained in the form of a rubbery violet-colored solid.

Preparation of the Electrolytes Based on PPFS-g-PEO/LiTFSI and Electrochemical Properties The electrolytes are prepared in a glovebox. The polymer and the salt are weighed out in the desired proportions ([LiTFSI]=20% by mass), and are then dissolved in acetone and mixed. The acetone is then evaporated off, and the electrolyte is then dried at 100° C. under a primary dynamic vacuum (P≈10$^{-1}$ mbar) for a minimum of 48 hours. To extract the last traces of water, the electrolyte is dried for one hour at 110° C. under a stream of argon.

The electrolytes obtained are formed (using a hot press in the case of the solids) and then introduced into a button cell (in blocking configuration) to determine their conductivity by EIS ("Electrochemical Impedance Spectroscopy").

Figure 9:
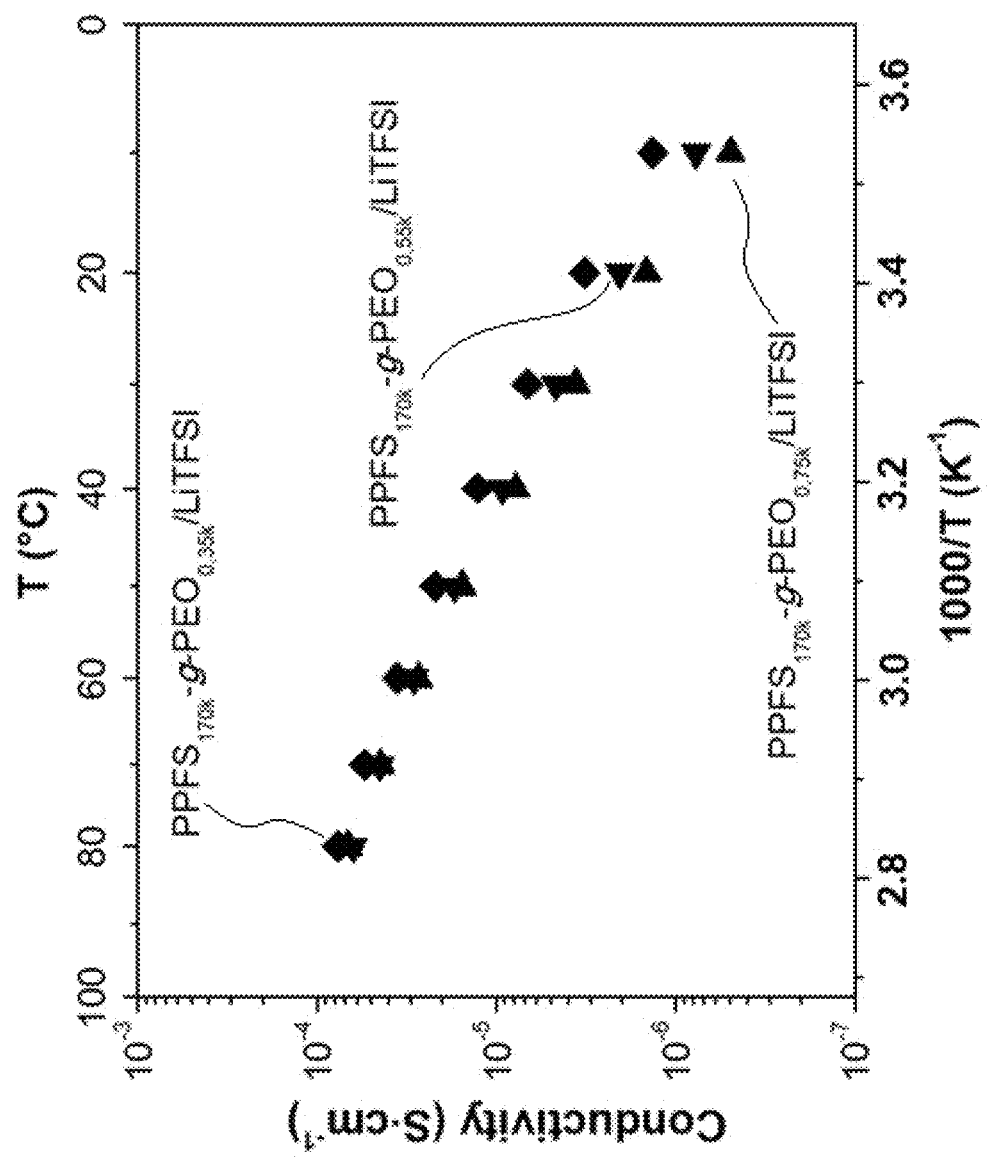
FIG. 9 represents the change in the ion conductivity (in S·cm$^{-1}$) as a function of the temperature, for the various electrolytes according to the invention based on comb polymers of the type PPFS-g-PEO prepared in example 4.

FIG. 9 represents the change in conductivity as a function of the temperature for the electrolytes PPFS-g-PEO/LiTFSI based on the comb polymers $PPFS_{170k}$-g-$PEO_{0.35k}$, $PPFS_{170k}$-g-$PEO_{0.55k}$ and $PPFS_{170k}$-g-$PEO_{0.75k}$ according to the invention.

Figure 10A:
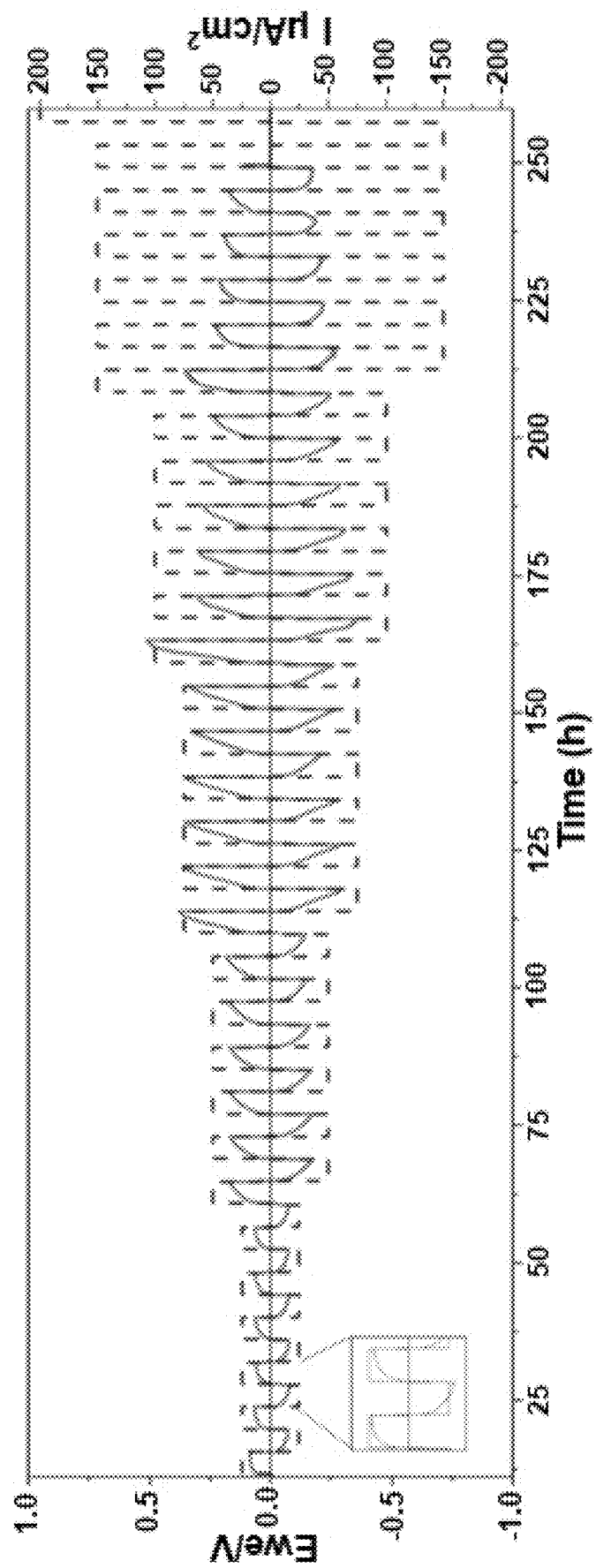
FIGS. 10A and B represent represents the galvanostatic cycling characterizations (GCPL) performed in a symmetrical button cell (Li/Li), and the associated EIS monitoring (Nyquist diagrams), for the electrolyte PPFS$_{170k}$-g-PEO$_{0.35k}$/LiTFSI (20% by mass, 60° C.) prepared in example 4.
Figure 10B:
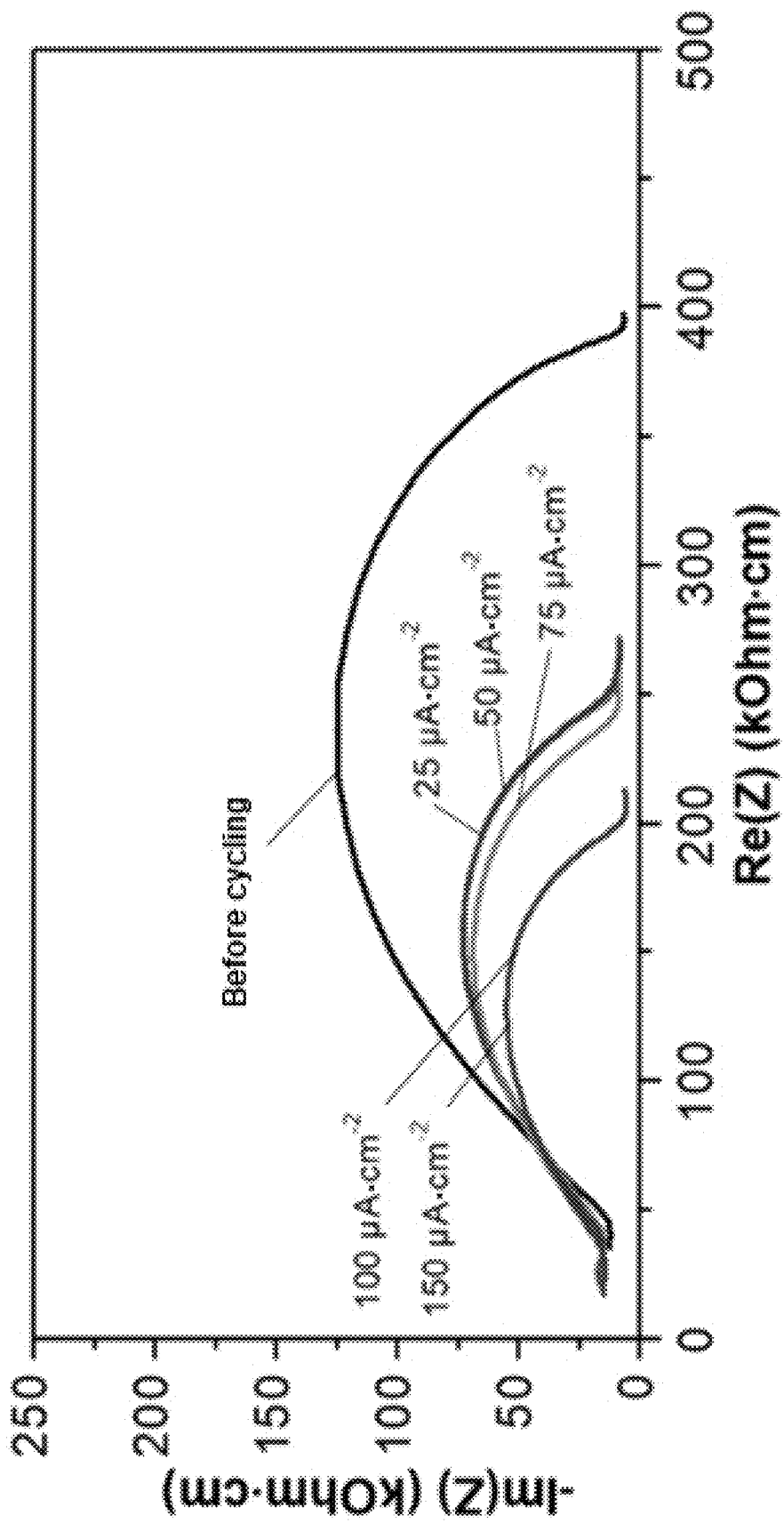
Figure 11A:
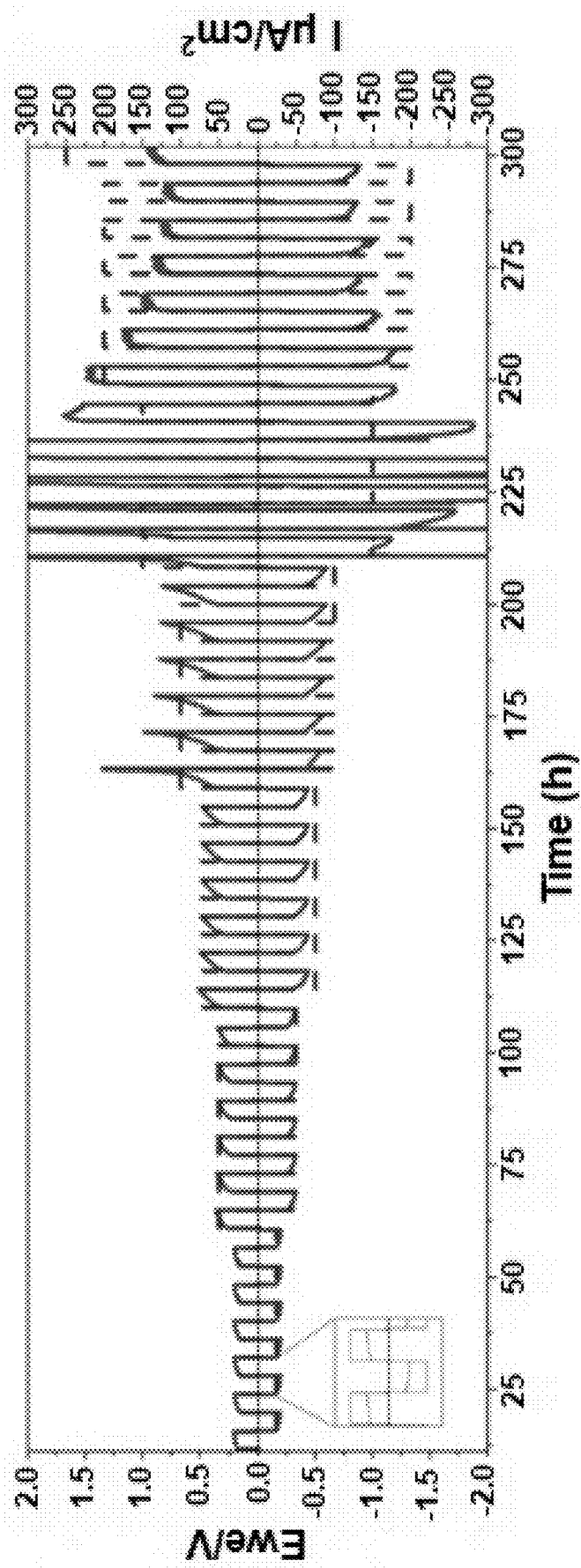
FIGS. 11A and B represent the galvanostatic cycling characterizations (GCPL) performed in a symmetrical button cell (Li/Li), and the associated EIS monitoring (Nyquist diagrams), for the electrolyte PPFS$_{170k}$-g-PEO$_{0.55k}$/LiTFSI (20% by mass, 60° C.) prepared in example 4.
Figure 11B:
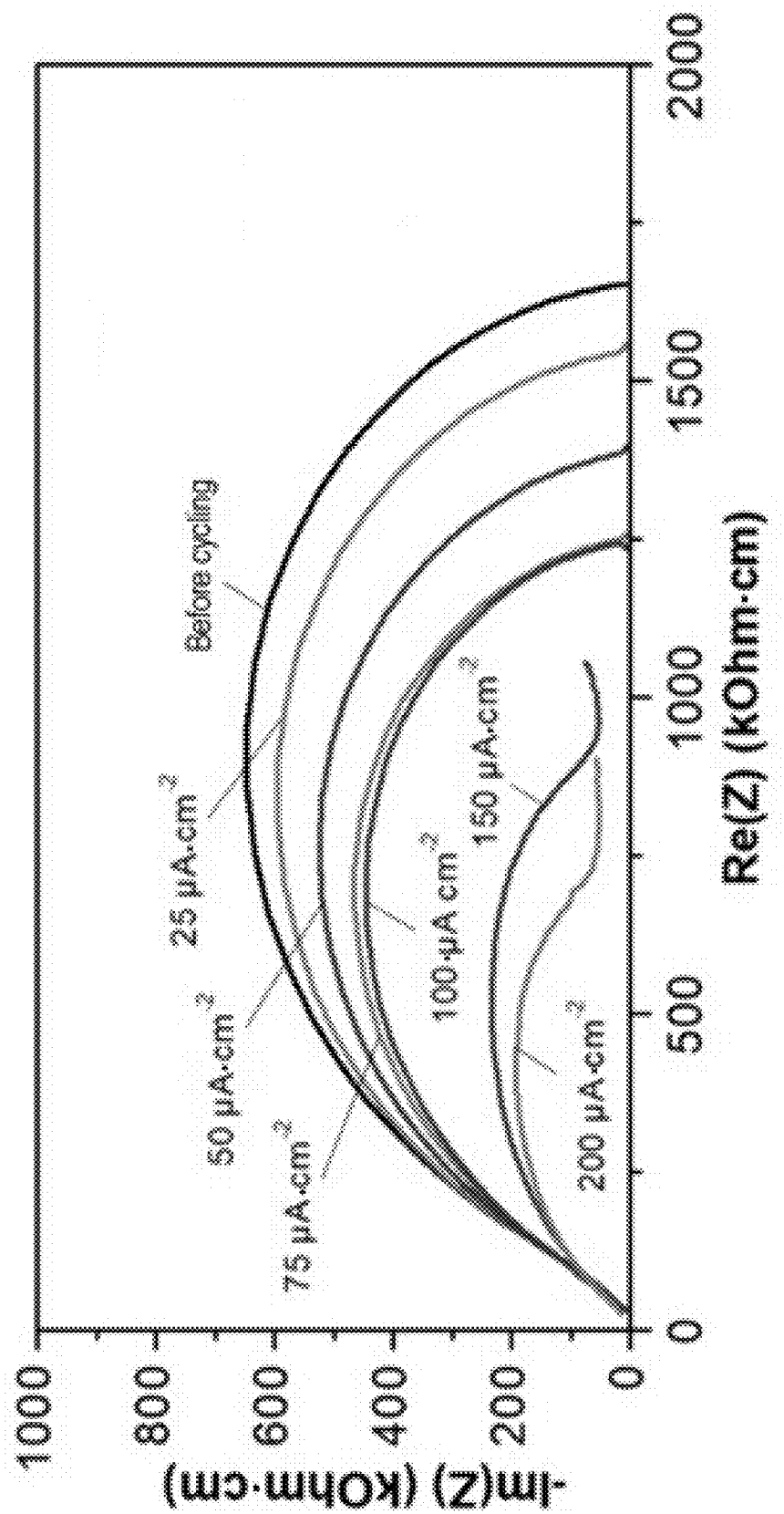
Figure 12A:
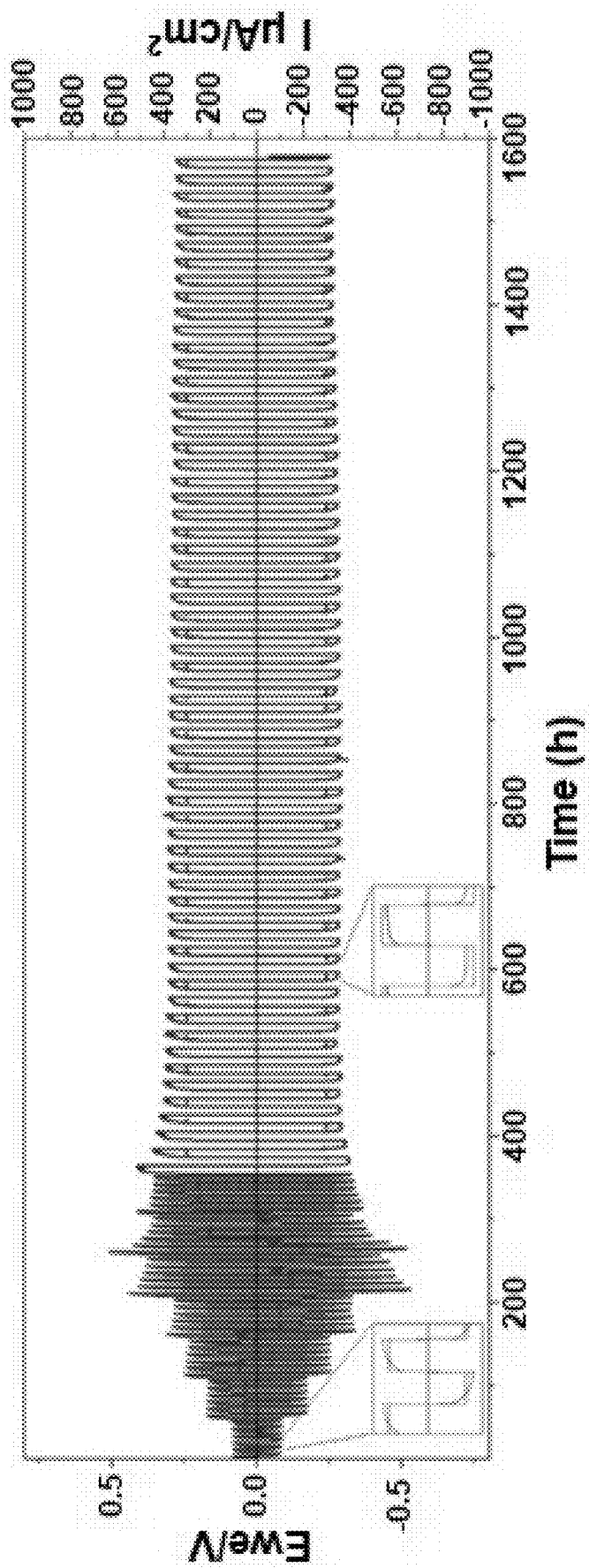
FIGS. 12A and B represent the galvanostatic cycling characterizations (GCPL) performed in a symmetrical button cell (Li/Li), and the associated EIS monitoring (Nyquist diagrams), for the electrolyte PPFS$_{170k}$-g-PEO$_{0.75k}$/LiTFSI (20% by mass, 60° C.) prepared in example 4.
Figure 12B:
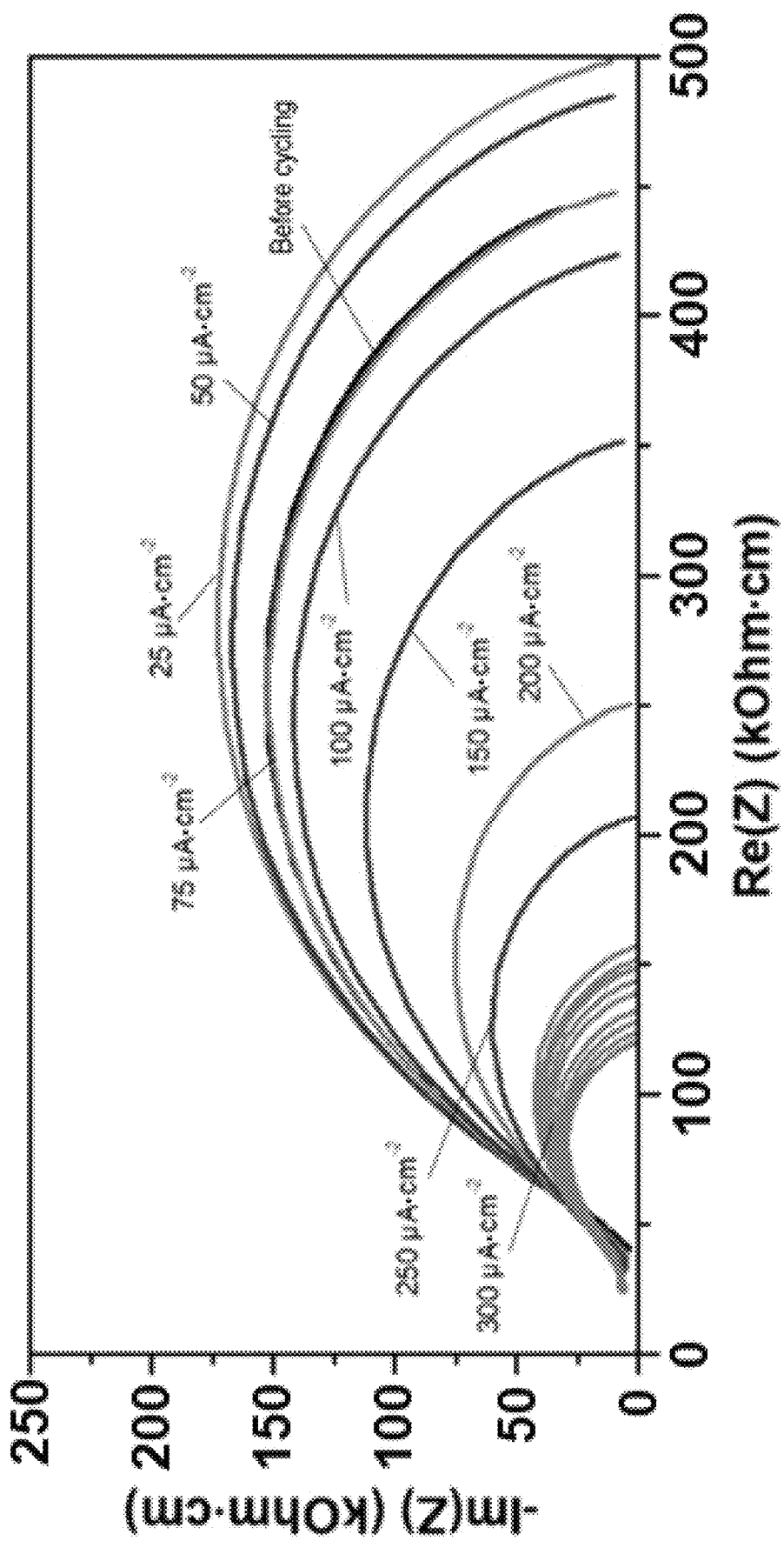

FIGS. 10A and B, 11A and B, and 12A and B show the galvanostatic cycling characterizations (GCPL) performed in a symmetrical button cell (Li/Li) for the electrolytes PPFS-g-PEO/LiTFSI and the associated EIS monitoring.

Figure 13:
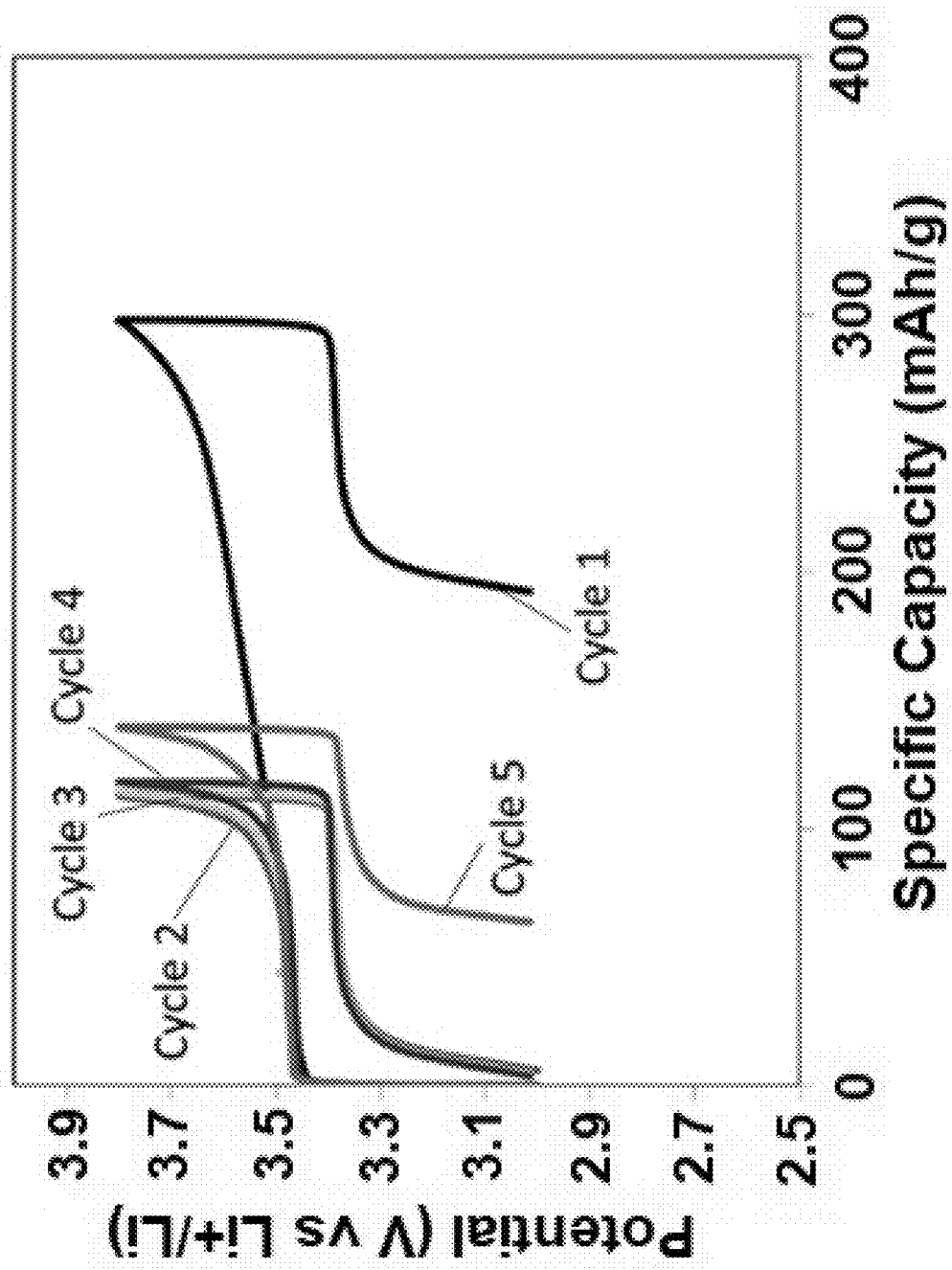
FIG. 13 represents the Li/LFP cycling behavior for the electrolyte PPFS$_{170k}$-g-PEO$_{0.75k}$/LiTFSI ([LiTFSI]=20% by mass) at 60° C.

FIG. 13 shows the cycling in a full Li/LFP cell, the formulation of the positive electrode of which is detailed in Table 1.

TABLE 1

| Materials | Composition (mass %) |
|---|---|
| LiFePO$_4$ (LFP) | 70 |
| Carbon black (KB600) | 2 |
| PVDF | 4 |
| Electrolyte ([LiTFSI] = 20% by mass) | 24 |

Example 5

Preparation of Poly(2,3,4,5,6-Pentafluorostyrene) Comb Polymers Bearing Poly(Trimethylene Carbonate) Grafts ("PPFS-g-PTMC")

5.1. Synthesis of PPFS$_{33k}$-g-PTMC$_{1.5k}$

PTMC ($M_n$=1.5 kg·mol$^{-1}$, $D_w$=1.1, 1.1 equivalents) is dissolved in THF, followed by addition of KOH (1.1 equivalents), and then addition of a solution of PPFS ($M_n$=33 kg·mol$^{-1}$, $D_w$=1.9, 1 equivalent) in THF. The reaction medium is refluxed for 48 hours. At the end of the reaction, the reaction medium is precipitated a first time from water to remove the salt (KF), the reaction byproduct. Preparative SEC is used to purify the product. After drying (at 80° C. for a minimum of 48 hours under a primary dynamic vacuum (P≈10$^{-1}$ mbar)), the comb copolymer is obtained in the form of a white solid.

5.2. Synthesis of PPFS$_{33k}$-g-PTMC$_{1.5k}$

PTMC ($M_n$=1.9 kg·mol$^{-1}$, $D_w$=1.1, 1.1 equivalents) is dissolved in THF, followed by addition of KOH (1.1 equivalents), and then addition of a solution of PPFS ($M_n$=33 kg·mol$^{-1}$, $D_w$=1.9, 1 equivalent) in THF. The reaction medium is refluxed for 48 hours. At the end of the reaction, the reaction medium is precipitated a first time from water to remove the salt (KF), the reaction byproduct. Preparative SEC is used to purify the product. After drying (at 80° C. for a minimum of 48 hours under a primary dynamic vacuum (P≈10$^{-1}$ mbar)), the comb copolymer is obtained in the form of a transparent molten polymer which crystallizes slowly over time (at room temperature).

Preparation of the Electrolytes PPFS-g-PTMC/LiTFSI

The electrolytes are prepared in a glovebox. The polymer and the salt are weighed out in the desired proportions ([LiTFSI]=20% by mass), and are then dissolved in acetone and mixed. The acetone is then evaporated off, and the electrolyte is then dried at 80° C. under a primary dynamic vacuum (P≈10$^{-1}$ mbar) for a minimum of 48 hours. To extract the last traces of water, the electrolyte is dried for one hour at 110° C. under a stream of argon.

PPFS-g-PTMC/LiTFSI Electrochemical Characterizations

Once dry, the electrolytes obtained are formed (using a hot press in the case of the solids) and then introduced into a button cell (in blocking configuration) to determine their conductivity by EIS ("Electrochemical Impedance Spectroscopy").

Figure 14:
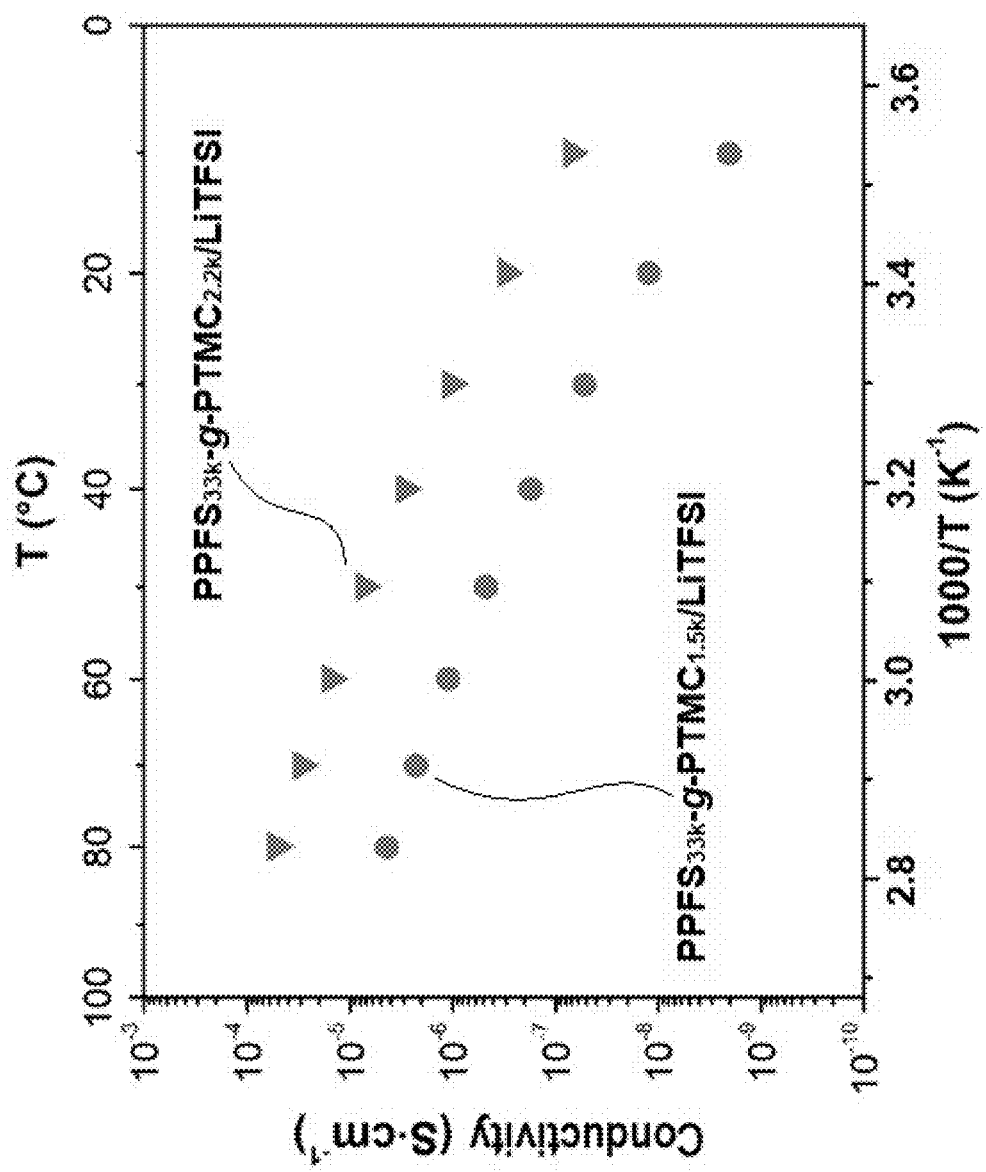
FIG. 14 represents the change in the ion conductivity (in S·cm$^{-1}$) as a function of the temperature, for the various electrolytes according to the invention based on comb polymers of the type PPFS-g-PTMC prepared in example 5.

FIG. 14 represents the change in the conductivity of the electrolytes PPFS-g-PTMC/LiTFSI ([LiTFSI]=20% by mass) as a function of the temperature.

Figure 15A:
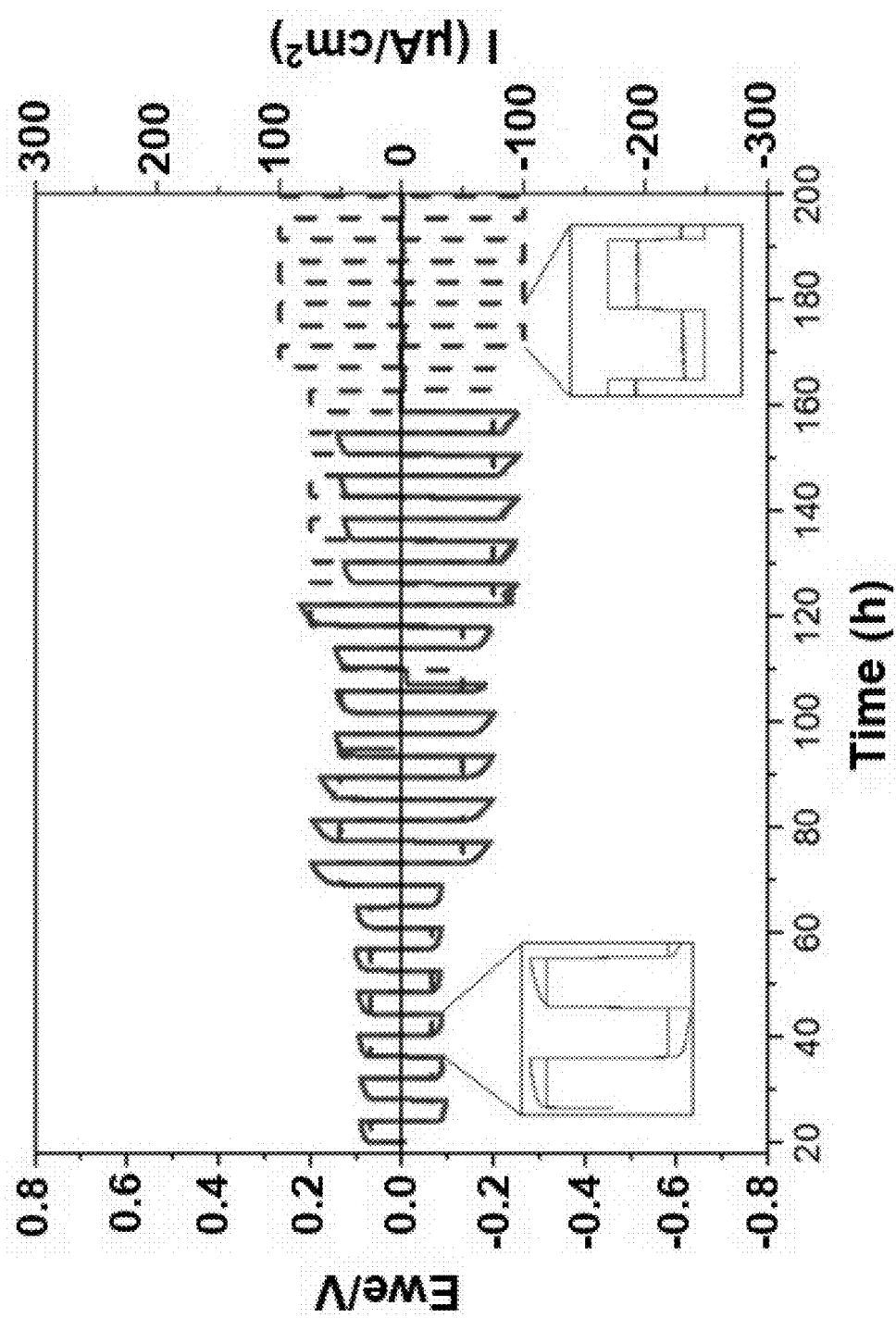
FIGS. 15A and B represent the galvanostatic cycling characterizations (GCPL) performed in a symmetrical button cell (Li/Li), and the associated EIS monitoring (Nyquist diagrams), for the electrolyte PPFS$_{33k}$-g-PTMC$_{1.5k}$/LiTFSI (20% by mass, 60° C.) prepared in example 5.
Figure 15B:
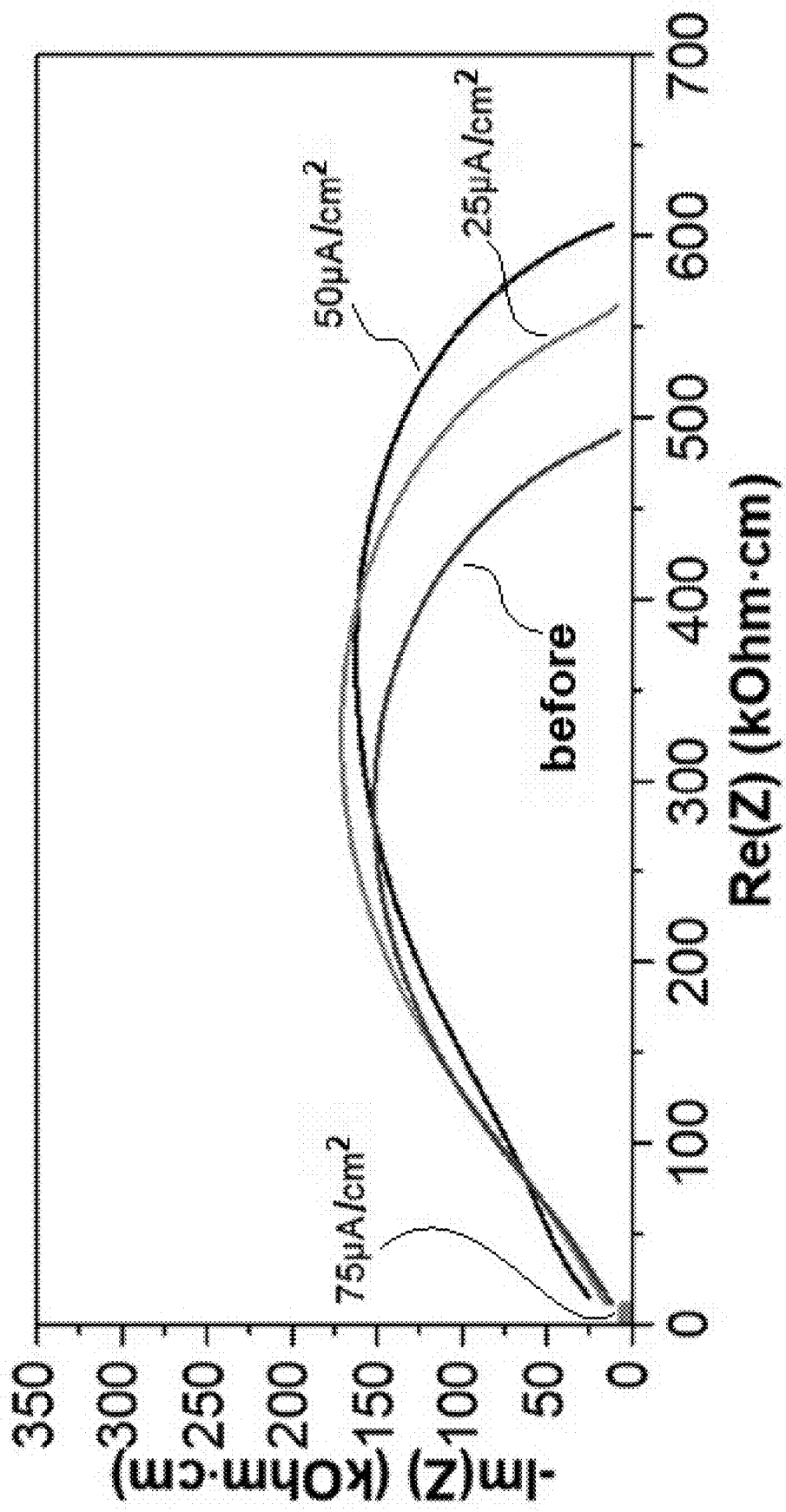

FIGS. 15A and B show the GCPL characterization performed in a symmetrical button cell (Li/Li) for the electrolyte PPFS$_{33k}$-g-PTMC$_{1.5k}$/LiTFSI and the associated EIS monitoring.

Figure 16:
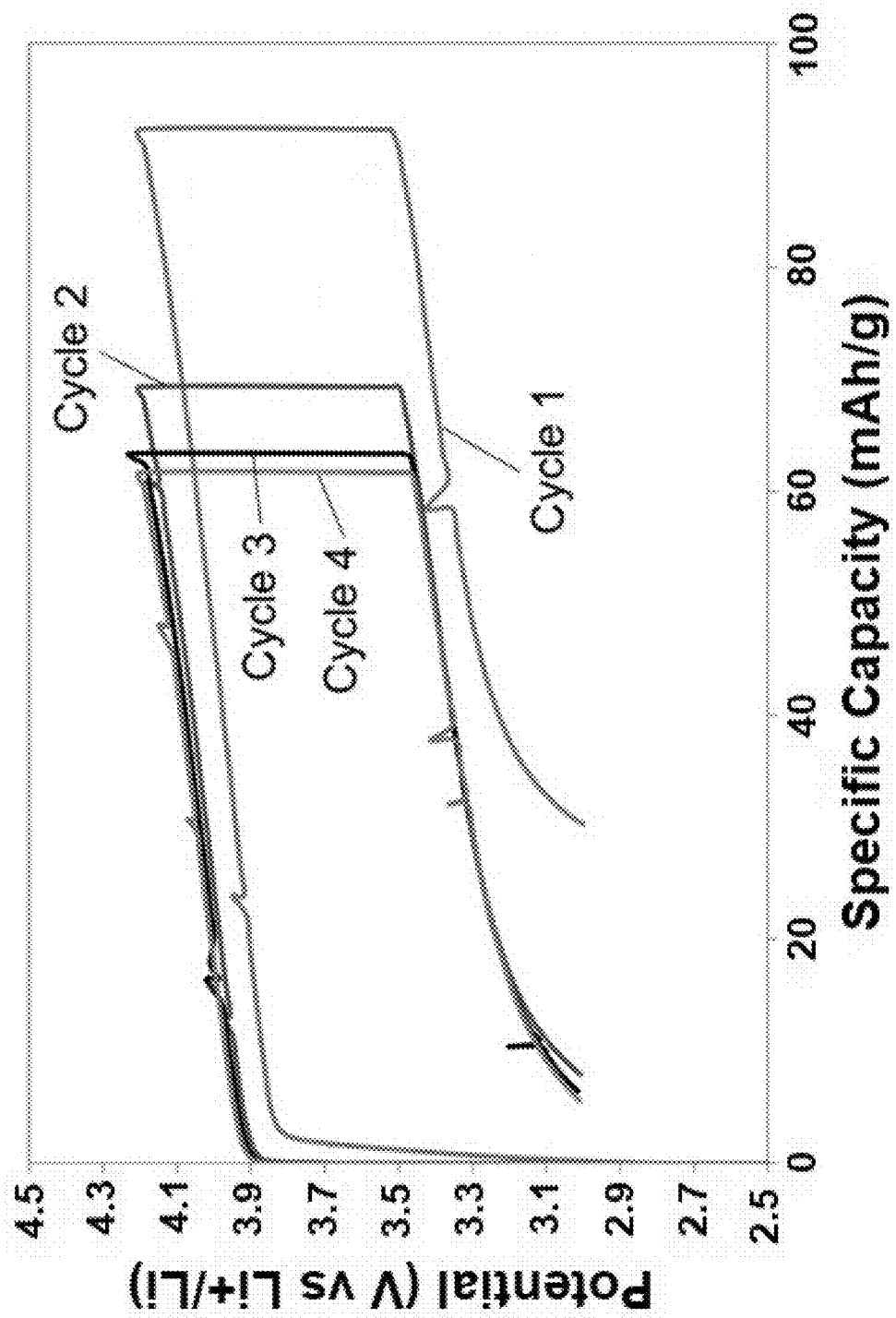
FIG. 16 represents the Li-NMC cycling behavior for the electrolyte PPFS$_{33k}$-8-PTMC$_{1.5k}$/LiTFSI ([LiTFSI]=20% by mass) at 60° C.

FIG. 16 shows the cycling in a full Li/NMC622 cell, the formulation of the positive electrode of which is detailed in Table 2.

TABLE 2

| Materials | Composition (mass %) |
| --- | --- |
| LiNi$_{0.6}$Mn$_{0.2}$Co$_{0.2}$O$_2$ (NMC622) | 70 |
| Carbon black (KB600) | 2 |
| PVDF | 4 |
| Electrolyte ([LiTFSI] = 20% by mass) | 24 |

LIST OF CITED DOCUMENTS

[1] Delaittre et al., Polym. Chem. 2018, 9, 2679-2684;
[2] Bates et al., Macromolecules 2015, 48, 4967-4973;
[3] Li et al., Macromolecules 2019, 52, 7234-7243;
[4] Makiguchi et al., Macromolecules 2011, 44, 1999-2005;
[5] Ott et al., Chem. Commun., 2008, 3516-3518;
[6] Cai et al., Polym. Chem., 2012, 3, 1061-1068;
[7] Powell et al., Macromolecules 2007, 40, 4509-4515;
[8] Pollack et al., ACS Appl. Mater. Interfaces 2014, 6, 19265-29274;
[9] Jankova K., Hvilsted S. Macromolecules, 36, 1753-1758, 2003.
[10] Sonniger Thierry, Catalyse de polymérisation [Polymerization catalysis], 1998;
[11] Soga, K. et al., Prog. Polym. Sci. 22, 1503-1546, 1997;
[12] Huang, J. et al., Prog. Polym. Sci. 20, 459-526, 1995.

The invention claimed is:

1. A solid polymer electrolyte, comprising:
    a comb polymer comprising a main chain comprising, in polymerized form, 1-ethenyl-2,3,4,5,6-pentafluorobenzene, 1-allyl-2,3,4,5,6-pentafluorobenzene monomer, or both, at least two monomer units of the main chain comprising a polymeric side chain comprising a polymer in place of the fluoro group in a para-position, the polymer acting as a solvent for alkali metal salt(s) and/or alkaline-earth metal salt(s); and
    the alkali metal salt(s) and/or alkaline-earth metal salt(s), wherein the polymeric side chain of the comb polymer is grafted in the para-position of the tetrafluorophenyl group, and
    wherein the main chain has a number-average degree of polymerization of greater than or equal to 50.

2. The solid polymer electrolyte of claim 1, wherein the alkali metal salt is present and comprises a lithium salt.

3. The solid polymer electrolyte of claim 1, wherein the main chain is formed from a poly(2,3,4,5,6-pentafluorostyrene).

4. The solid polymer electrolyte of claim 1, wherein the polymeric side chain is connected to the main chain via an oxygen atom.

5. The solid polymer electrolyte of claim 1, wherein a molar degree of grafting with the polymeric side chain is less than or equal to 99%.

6. The solid polymer electrolyte of claim 1, wherein the polymeric side chain has a number-average degree of polymerization of greater than or equal to 4.

7. The solid polymer electrolyte of claim 1, wherein the comb polymer has a degree of molar grafting with the polymeric side chain in a range of from 25 to 95%.

8. The solid polymer electrolyte of claim 1, wherein the comb polymer is of formula (II'):

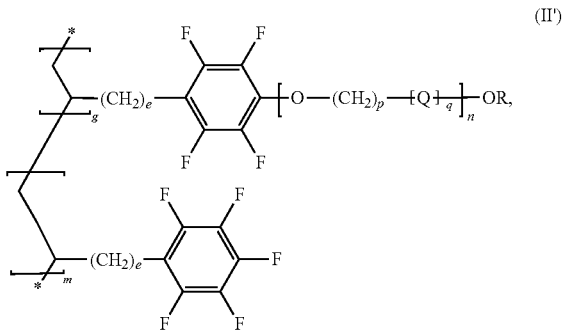

wherein
e is 0 or 1;
p is an integer in a range of from 2 to 20;
q is 0 or 1;
Q is an oxycarbonyl —OC(O)— or carbonyl —C(O)— group;
n is a positive integer;
R is a non-reactive group;
g corresponds to an average number of monomer units comprising the polymeric side chain; and
m corresponds to an average number of non-grafted monomer units;
with g/(g+m), being a molar degree of grafting with polymeric side chains, being less than or equal to 0.99,
wherein an order of succession of the monomer units forming the polymer of formula (II') being random.

9. The solid polymer electrolyte of claim 1, wherein the polymeric side chain comprises polyalkylene glycol, or
wherein the polymeric side chain comprises, in polymerized form, a 5-membered lactone, 6-membered lactone, 7-membered lactone, 8-membered lactone, 5-membered cyclic carbonate, 6-membered cyclic carbonate, 7-membered cyclic carbonate, 8-membered cyclic carbonate, or a mixture thereof.

10. The solid polymer electrolyte of claim 9, wherein the polymeric side chain comprises poly(ethylene oxide) poly(trimethylene carbonate), or poly(ε-caprolactone).

11. The solid polymer electrolyte of claim 1, wherein the comb polymer comprises grafted monomer units of formula (I'):

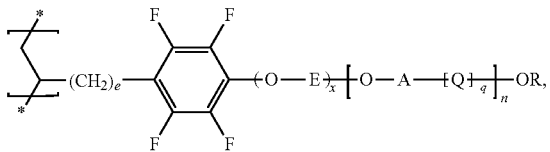

wherein:
e is 0 or 1;
x is 0 or 1;
E is a $C_1$ to $C_6$ alkylene group;
A is a linear or branched $C_2$ to $C_{20}$ alkylene group;
Q is an oxycarbonyl —OC(O)— or carbonyl —C(O)— group;
q is 0 or 1;
n is a positive integer; and
R is a non-reactive group.

12. The solid polymer electrolyte of claim 11, wherein R is an alkyl group, optionally substituted with one or more cyclic groups, the alkyl group and/or the cyclic group(s) optionally being substituted with one or more fluorine atoms.

13. An electrochemical system, comprising:
the solid polymer electrolyte of claim 1.

14. The electrochemical system of claim 13, which is a battery.

15. The electrochemical system of claim 13, which is a lithium battery.

16. A process for preparing a solid polymer electrolyte film, the process comprising:
(i) mixing at least one comb polymer and at least one alkali metal salt, at least one alkaline-earth metal salt, or both, optionally in the presence of a solvent, thereby obtaining a mixture; and
(ii) forming a film from the mixture,
wherein the comb polymer comprises a main chain comprising, in reacted form, 1-ethenyl-2,3,4,5,6-pentafluorobenzene, 1-allyl-2,3,4,5,6-pentafluorobenzene, or both, at least two monomer units of the main chain comprising a polymeric side chain comprising a polymer in place of the fluoro group in a para-position, the polymer acting as a solvent for alkali metal salt(s) and/or alkaline-earth metal salt(s),
wherein the polymeric side chain is grafted in the para position of the tetrafluorophenyl group, and
wherein the main chain has a number-average degree of polymerization of greater than or equal to 50.

17. The process of claim 16, wherein the solid polymer electrolyte film is prepared in the absence of solvent, via a melt route.

18. The process of claim 16, wherein the comb polymer has a degree of molar grafting with the polymeric side chain in a range of from 25 to 95%.

19. The process of claim 16, wherein the mixing is performed in the solvent, and
wherein the forming comprises (ii-a) depositing the mixture onto a surface of a substrate, and (ii-b) evaporating off the solvent.

20. The process of claim 16, wherein the alkali metal salt is present and comprises $LiPF_6$, $LiClO_4$, $LiBF_4$, $LiASF_6$, $LiCF_3SO_3$, $LIN(C_2F_5SO_2)_2$, lithium bistrifluoromethylsulfonylimide $LiN[SO_2CF_3]_2$, lithium bis(fluorosulfonyl)amide $LiN[SO_2F]_2$, lithium 4,5-dicyano-2-(trifluoromethyl)imidazole, lithium bispentafluoroethylsulfonylimide, lithium bis(oxalato)borate, lithium difluoro(oxalato)borate, or a mixture thereof.

* * * * *